(12) United States Patent
Park et al.

(10) Patent No.: US 9,804,892 B2
(45) Date of Patent: *Oct. 31, 2017

(54) TRACKING LARGE NUMBERS OF MOVING OBJECTS IN AN EVENT PROCESSING SYSTEM

(71) Applicant: Oracle International Corporation, Redwood Shores, CA (US)

(72) Inventors: Hoyong Park, San Jose, CA (US); Eric Hsiao, San Mateo, CA (US); Andy Piper, Amersham (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,650

(22) Filed: Nov. 23, 2016

(65) Prior Publication Data

US 2017/0075726 A1    Mar. 16, 2017

Related U.S. Application Data

(63) Continuation of application No. 14/883,815, filed on Oct. 15, 2015, now Pat. No. 9,535,761, which is a (Continued)

(51) Int. Cl.
*G06F 9/50* (2006.01)
*G06F 17/30* (2006.01)
*G06F 9/54* (2006.01)

(52) U.S. Cl.
CPC ............ *G06F 9/505* (2013.01); *G06F 9/5027* (2013.01); *G06F 9/542* (2013.01); (Continued)

(58) Field of Classification Search
None
See application file for complete search history.

(56) References Cited

U.S. PATENT DOCUMENTS

| 4,996,687 A | 2/1991 | Hess et al. |
| 5,051,947 A | 9/1991 | Messenger et al. |

(Continued)

FOREIGN PATENT DOCUMENTS

| CN | 101866353 | 10/2010 |
| CN | 102135984 | 7/2011 |

(Continued)

OTHER PUBLICATIONS

Nah et al.; "A Cluster-Based TMO-Structured Scalable Approach for Location Information Systems"; 2003; WORDS 2003 Fall Proceedings; Ninth IEEE International Workshop on Date of Conference: Oct. 1-3, 2003, pp. 1023-1030.*

(Continued)

*Primary Examiner* — Umut Onat
(74) *Attorney, Agent, or Firm* — Kilpatrick Townsend and Stockton LLP

(57) ABSTRACT

Techniques for tracking large numbers of moving objects in an event processing system are provided. An input event stream can be received, where the events in the input event stream represent the movement of a plurality of geometries or objects. The input event stream can then be partitioned among a number of processing nodes of the event processing system, thereby enabling parallel processing of one or more continuous queries for tracking the objects. The partitioning can be performed such that each processing node is configured to track objects in a predefined spatial region, and the spatial regions for at least two nodes overlap. This overlapping window enables a single node to find, e.g., all of the objects within a particular distance of a target object, even if the target object is in the process of moving from the region of that node to the overlapping region of another node.

20 Claims, 8 Drawing Sheets

Related U.S. Application Data continuation of application No. 13/107,742, filed on May 13, 2011, now Pat. No. 9,189,280.

(52) U.S. Cl.
CPC .. *G06F 17/30324* (2013.01); *G06F 17/30327* (2013.01); *G06F 17/30377* (2013.01)

(56) References Cited

U.S. PATENT DOCUMENTS

| | | | |
|---|---|---|---|
| 5,339,392 | A | 8/1994 | Risberg et al. |
| 5,495,600 | A | 2/1996 | Terry et al. |
| 5,706,494 | A | 1/1998 | Cochrane et al. |
| 5,802,262 | A | 9/1998 | Van De Vanter |
| 5,802,523 | A | 9/1998 | Jasuja et al. |
| 5,822,750 | A | 10/1998 | Jou et al. |
| 5,826,077 | A | 10/1998 | Blakeley et al. |
| 5,850,544 | A | 12/1998 | Parvathaneny et al. |
| 5,857,182 | A | 1/1999 | Demichiel et al. |
| 5,918,225 | A | 6/1999 | White et al. |
| 5,920,716 | A | 7/1999 | Johnson et al. |
| 5,937,195 | A | 8/1999 | Ju et al. |
| 5,937,401 | A | 8/1999 | Hillegas |
| 6,006,235 | A | 12/1999 | Macdonald et al. |
| 6,011,916 | A | 1/2000 | Moore et al. |
| 6,041,344 | A | 3/2000 | Bodamer et al. |
| 6,081,801 | A | 6/2000 | Cochrane et al. |
| 6,092,065 | A | 7/2000 | Floratos et al. |
| 6,108,666 | A | 8/2000 | Floratos et al. |
| 6,112,198 | A | 8/2000 | Lohman et al. |
| 6,128,610 | A | 10/2000 | Srinivasan et al. |
| 6,158,045 | A | 12/2000 | You |
| 6,212,673 | B1 | 4/2001 | House et al. |
| 6,219,660 | B1 | 4/2001 | Haderle et al. |
| 6,263,332 | B1 | 7/2001 | Nasr et al. |
| 6,278,994 | B1 | 8/2001 | Fuh et al. |
| 6,282,537 | B1 | 8/2001 | Madnick et al. |
| 6,341,281 | B1 | 1/2002 | MacNicol et al. |
| 6,353,821 | B1 | 3/2002 | Gray |
| 6,367,034 | B1 | 4/2002 | Novik et al. |
| 6,370,537 | B1 | 4/2002 | Gilbert et al. |
| 6,389,436 | B1 | 5/2002 | Chakrabarti et al. |
| 6,397,262 | B1 | 5/2002 | Hayden et al. |
| 6,418,448 | B1 | 7/2002 | Sarkar |
| 6,438,540 | B2 | 8/2002 | Nasr et al. |
| 6,438,559 | B1 | 8/2002 | White et al. |
| 6,439,783 | B1 | 8/2002 | Antoshenkov |
| 6,449,620 | B1 | 9/2002 | Draper et al. |
| 6,453,314 | B1 | 9/2002 | Chan et al. |
| 6,507,834 | B1 | 1/2003 | Kabra et al. |
| 6,523,102 | B1 | 2/2003 | Dye et al. |
| 6,546,381 | B1 | 4/2003 | Subramanian et al. |
| 6,615,203 | B1 | 9/2003 | Lin et al. |
| 6,633,867 | B1 | 10/2003 | Kraft et al. |
| 6,681,343 | B1 | 1/2004 | Nakabo |
| 6,708,186 | B1 | 3/2004 | Claborn et al. |
| 6,718,278 | B1* | 4/2004 | Steggles ............... G01S 5/186 324/331 |
| 6,748,386 | B1 | 6/2004 | Li |
| 6,751,619 | B1 | 6/2004 | Rowstron et al. |
| 6,766,330 | B1 | 7/2004 | Chen et al. |
| 6,785,677 | B1 | 8/2004 | Fritchman |
| 6,826,566 | B2 | 11/2004 | Lewak et al. |
| 6,836,778 | B2 | 12/2004 | Manikutty et al. |
| 6,850,925 | B2 | 2/2005 | Chaudhuri et al. |
| 6,856,981 | B2 | 2/2005 | Wyschogrod et al. |
| 6,904,019 | B2 | 6/2005 | Heinen et al. |
| 6,985,904 | B1 | 1/2006 | Kaluskar et al. |
| 6,986,019 | B1 | 1/2006 | Bagashev et al. |
| 6,996,557 | B1 | 2/2006 | Leung et al. |
| 7,020,696 | B1 | 3/2006 | Perry et al. |
| 7,047,249 | B1 | 5/2006 | Vincent |
| 7,051,034 | B1 | 5/2006 | Ghosh et al. |
| 7,062,749 | B2 | 6/2006 | Cyr et al. |
| 7,080,062 | B1 | 7/2006 | Leung et al. |
| 7,093,023 | B2 | 8/2006 | Lockwood et al. |
| 7,145,938 | B2 | 12/2006 | Takeuchi et al. |
| 7,146,352 | B2 | 12/2006 | Brundage et al. |
| 7,167,848 | B2 | 1/2007 | Boukouvalas et al. |
| 7,203,927 | B2 | 4/2007 | Al-Azzawe et al. |
| 7,224,185 | B2 | 5/2007 | Campbell et al. |
| 7,225,188 | B1 | 5/2007 | Gai et al. |
| 7,236,972 | B2 | 6/2007 | Lewak et al. |
| 7,284,041 | B2 | 10/2007 | Nakatani et al. |
| 7,305,391 | B2 | 12/2007 | Wyschogrod et al. |
| 7,308,561 | B2 | 12/2007 | Cornet et al. |
| 7,310,638 | B1 | 12/2007 | Blair |
| 7,348,981 | B1 | 3/2008 | Buck |
| 7,376,656 | B2 | 5/2008 | Blakeley et al. |
| 7,383,253 | B1 | 6/2008 | Tsimelzon et al. |
| 7,403,959 | B2 | 7/2008 | Nishizawa et al. |
| 7,430,549 | B2 | 9/2008 | Zane et al. |
| 7,440,461 | B2 | 10/2008 | Sahita et al. |
| 7,451,143 | B2 | 11/2008 | Sharangpani et al. |
| 7,475,058 | B2 | 1/2009 | Kakivaya et al. |
| 7,483,976 | B2 | 1/2009 | Ross |
| 7,516,121 | B2 | 4/2009 | Liu et al. |
| 7,519,577 | B2 | 4/2009 | Brundage et al. |
| 7,519,962 | B2 | 4/2009 | Aman |
| 7,526,804 | B2 | 4/2009 | Shelest et al. |
| 7,533,087 | B2 | 5/2009 | Liu et al. |
| 7,546,284 | B1 | 6/2009 | Martinez et al. |
| 7,552,365 | B1 | 6/2009 | Marsh et al. |
| 7,567,953 | B2 | 7/2009 | Kadayam et al. |
| 7,580,946 | B2 | 8/2009 | Mansour et al. |
| 7,587,383 | B2 | 9/2009 | Koo et al. |
| 7,603,674 | B2 | 10/2009 | Cyr et al. |
| 7,613,848 | B2 | 11/2009 | Amini et al. |
| 7,620,851 | B1 | 11/2009 | Leavy et al. |
| 7,630,982 | B2 | 12/2009 | Boyce |
| 7,634,501 | B2 | 12/2009 | Yabloko |
| 7,636,703 | B2 | 12/2009 | Taylor |
| 7,644,066 | B2 | 1/2010 | Krishnaprasad et al. |
| 7,653,645 | B1 | 1/2010 | Stokes |
| 7,672,964 | B1 | 3/2010 | Yan et al. |
| 7,673,065 | B2 | 3/2010 | Srinivasan et al. |
| 7,676,461 | B2 | 3/2010 | Chkodrov et al. |
| 7,689,622 | B2 | 3/2010 | Liu et al. |
| 7,693,891 | B2 | 4/2010 | Stokes et al. |
| 7,702,629 | B2 | 4/2010 | Cytron et al. |
| 7,702,639 | B2 | 4/2010 | Stanley et al. |
| 7,711,782 | B2 | 5/2010 | Kim et al. |
| 7,716,210 | B2 | 5/2010 | Ozcan et al. |
| 7,739,265 | B2 | 6/2010 | Jain et al. |
| 7,805,445 | B2 | 9/2010 | Boyer et al. |
| 7,814,111 | B2 | 10/2010 | Levin |
| 7,818,313 | B1 | 10/2010 | Tsimelzon et al. |
| 7,823,066 | B1 | 10/2010 | Kuramura |
| 7,827,146 | B1 | 11/2010 | De Landstheer et al. |
| 7,827,190 | B2 | 11/2010 | Pandya |
| 7,844,829 | B2 | 11/2010 | Meenakshisundaram |
| 7,870,124 | B2 | 1/2011 | Liu et al. |
| 7,870,167 | B2 | 1/2011 | Lu et al. |
| 7,877,381 | B2 | 1/2011 | Ewen et al. |
| 7,895,187 | B2 | 2/2011 | Bowman |
| 7,912,853 | B2 | 3/2011 | Agrawal |
| 7,917,299 | B2 | 3/2011 | Buhler et al. |
| 7,930,322 | B2 | 4/2011 | MacLennan |
| 7,945,540 | B2 | 5/2011 | Park et al. |
| 7,953,728 | B2 | 5/2011 | Hu et al. |
| 7,954,109 | B1 | 5/2011 | Durham et al. |
| 7,979,420 | B2 | 7/2011 | Jain et al. |
| 7,984,043 | B1 | 7/2011 | Waas |
| 7,987,204 | B2 | 7/2011 | Stokes |
| 7,991,766 | B2 | 8/2011 | Srinivasan et al. |
| 7,996,388 | B2 | 8/2011 | Jain et al. |
| 8,019,747 | B2 | 9/2011 | Srinivasan et al. |
| 8,032,544 | B2 | 10/2011 | Jing et al. |
| 8,046,747 | B2 | 10/2011 | Cyr et al. |
| 8,099,400 | B2 | 1/2012 | Haub et al. |
| 8,122,006 | B2 | 2/2012 | de Castro Alves et al. |
| 8,134,184 | B2 | 3/2012 | Becker et al. |
| 8,145,686 | B2 | 3/2012 | Raman et al. |
| 8,145,859 | B2 | 3/2012 | Park et al. |

(56) References Cited

U.S. PATENT DOCUMENTS

| | | | |
|---|---|---|---|
| 8,155,880 B2* | 4/2012 | Patel | G06F 17/30241 455/456.3 |
| 8,190,738 B2 | 5/2012 | Ruehle | |
| 8,195,648 B2 | 6/2012 | Zabback et al. | |
| 8,204,873 B2 | 6/2012 | Chavan | |
| 8,260,803 B2 | 9/2012 | Hsu et al. | |
| 8,290,776 B2 | 10/2012 | Moriwaki et al. | |
| 8,296,316 B2 | 10/2012 | Jain et al. | |
| 8,307,343 B2 | 11/2012 | Chaudhuri et al. | |
| 8,315,990 B2 | 11/2012 | Barga et al. | |
| 8,316,012 B2 | 11/2012 | Abouzied et al. | |
| 8,321,450 B2 | 11/2012 | Thatte et al. | |
| 8,332,502 B1 | 12/2012 | Neuhaus et al. | |
| 8,346,511 B2 | 1/2013 | Schoning et al. | |
| 8,352,517 B2 | 1/2013 | Park et al. | |
| 8,370,812 B2 | 2/2013 | Feblowitz et al. | |
| 8,386,466 B2 | 2/2013 | Park et al. | |
| 8,387,076 B2 | 2/2013 | Thatte et al. | |
| 8,392,402 B2 | 3/2013 | Mihaila et al. | |
| 8,396,886 B1 | 3/2013 | Tsimelzon et al. | |
| 8,447,744 B2 | 5/2013 | De Castro Alves et al. | |
| 8,458,175 B2 | 6/2013 | Stokes | |
| 8,498,956 B2 | 7/2013 | Srinivasan et al. | |
| 8,527,458 B2 | 9/2013 | Park et al. | |
| 8,572,589 B2 | 10/2013 | Cataldo et al. | |
| 8,589,436 B2 | 11/2013 | Srinivasan et al. | |
| 8,595,840 B1 | 11/2013 | Malibiran et al. | |
| 8,676,841 B2 | 3/2014 | Srinivasan et al. | |
| 8,713,049 B2 | 4/2014 | Jain et al. | |
| 8,719,207 B2 | 5/2014 | Ratnam et al. | |
| 8,738,572 B2 | 5/2014 | Bird et al. | |
| 8,745,070 B2 | 6/2014 | Krishnamurthy et al. | |
| 8,762,369 B2 | 6/2014 | Macho et al. | |
| 8,880,493 B2 | 11/2014 | Chen et al. | |
| 8,959,106 B2 | 2/2015 | De Castro Alves et al. | |
| 9,015,102 B2 | 4/2015 | van Lunteren | |
| 9,047,249 B2 | 6/2015 | De Castro Alves et al. | |
| 9,058,360 B2 | 6/2015 | De Castro Alves et al. | |
| 9,098,587 B2 | 8/2015 | Deshmukh et al. | |
| 9,110,945 B2 | 8/2015 | Jain et al. | |
| 9,189,280 B2 | 11/2015 | Park et al. | |
| 9,244,978 B2 | 1/2016 | Alves et al. | |
| 9,256,646 B2 | 2/2016 | Deshmukh et al. | |
| 9,262,258 B2 | 2/2016 | Alves et al. | |
| 9,262,479 B2 | 2/2016 | Deshmukh et al. | |
| 9,286,352 B2 | 3/2016 | Park et al. | |
| 9,292,574 B2 | 3/2016 | Hsiao et al. | |
| 9,305,057 B2 | 4/2016 | De Castro Alves et al. | |
| 9,305,238 B2 | 4/2016 | Srinivasan et al. | |
| 9,430,494 B2 | 8/2016 | Park et al. | |
| 9,535,761 B2 | 1/2017 | Park et al. | |
| 9,563,663 B2 | 2/2017 | Shukla et al. | |
| 9,703,836 B2 | 7/2017 | Hsiao et al. | |
| 9,712,645 B2 | 7/2017 | de Castro Alves et al. | |
| 9,715,529 B2 | 7/2017 | Park et al. | |
| 2002/0023211 A1 | 2/2002 | Roth et al. | |
| 2002/0032804 A1 | 3/2002 | Hunt | |
| 2002/0038306 A1 | 3/2002 | Griffin et al. | |
| 2002/0038313 A1 | 3/2002 | Klein et al. | |
| 2002/0049788 A1 | 4/2002 | Lipkin et al. | |
| 2002/0056004 A1 | 5/2002 | Smith et al. | |
| 2002/0073399 A1 | 6/2002 | Golden | |
| 2002/0116362 A1 | 8/2002 | Li et al. | |
| 2002/0116371 A1 | 8/2002 | Dodds et al. | |
| 2002/0133484 A1 | 9/2002 | Chau et al. | |
| 2002/0169788 A1 | 11/2002 | Lee et al. | |
| 2003/0014408 A1 | 1/2003 | Robertson | |
| 2003/0037048 A1 | 2/2003 | Kabra et al. | |
| 2003/0046673 A1 | 3/2003 | Copeland et al. | |
| 2003/0065655 A1 | 4/2003 | Syeda-mahmood | |
| 2003/0065659 A1 | 4/2003 | Agarwal et al. | |
| 2003/0120682 A1 | 6/2003 | Bestgen et al. | |
| 2003/0135304 A1 | 7/2003 | Sroub et al. | |
| 2003/0200198 A1 | 10/2003 | Chandrasekar et al. | |
| 2003/0212664 A1 | 11/2003 | Breining et al. | |
| 2003/0229652 A1 | 12/2003 | Bakalash et al. | |
| 2003/0236766 A1 | 12/2003 | Fortuna et al. | |
| 2004/0010496 A1 | 1/2004 | Behrendt et al. | |
| 2004/0019592 A1 | 1/2004 | Crabtree | |
| 2004/0024773 A1 | 2/2004 | Stoffel et al. | |
| 2004/0064466 A1 | 4/2004 | Manikutty et al. | |
| 2004/0073534 A1 | 4/2004 | Robson | |
| 2004/0088404 A1 | 5/2004 | Aggarwal | |
| 2004/0117359 A1 | 6/2004 | Snodgrass et al. | |
| 2004/0136598 A1 | 7/2004 | Le Leannec et al. | |
| 2004/0151382 A1 | 8/2004 | Stellenberg et al. | |
| 2004/0153329 A1 | 8/2004 | Casati et al. | |
| 2004/0167864 A1 | 8/2004 | Wang et al. | |
| 2004/0168107 A1 | 8/2004 | Sharp et al. | |
| 2004/0177053 A1 | 9/2004 | Donoho et al. | |
| 2004/0201612 A1 | 10/2004 | Hild et al. | |
| 2004/0205082 A1 | 10/2004 | Fontoura et al. | |
| 2004/0220896 A1 | 11/2004 | Finlay et al. | |
| 2004/0220912 A1 | 11/2004 | Manikutty et al. | |
| 2004/0220927 A1 | 11/2004 | Murthy et al. | |
| 2004/0243590 A1 | 12/2004 | Gu et al. | |
| 2004/0267760 A1 | 12/2004 | Brundage et al. | |
| 2004/0268314 A1 | 12/2004 | Kollman et al. | |
| 2005/0010896 A1 | 1/2005 | Meliksetian et al. | |
| 2005/0055338 A1 | 3/2005 | Warner et al. | |
| 2005/0065949 A1 | 3/2005 | Warner et al. | |
| 2005/0096124 A1 | 5/2005 | Stronach | |
| 2005/0097128 A1 | 5/2005 | Ryan et al. | |
| 2005/0108368 A1 | 5/2005 | Mohan et al. | |
| 2005/0120016 A1 | 6/2005 | Midgley | |
| 2005/0154740 A1 | 7/2005 | Day et al. | |
| 2005/0174940 A1 | 8/2005 | Iny | |
| 2005/0177579 A1 | 8/2005 | Blakeley et al. | |
| 2005/0192921 A1 | 9/2005 | Chaudhuri et al. | |
| 2005/0204340 A1 | 9/2005 | Ruminer et al. | |
| 2005/0229158 A1 | 10/2005 | Thusoo et al. | |
| 2005/0273352 A1 | 12/2005 | Moffat et al. | |
| 2005/0273450 A1 | 12/2005 | McMillen et al. | |
| 2005/0289125 A1 | 12/2005 | Liu et al. | |
| 2006/0007308 A1 | 1/2006 | Ide et al. | |
| 2006/0015482 A1 | 1/2006 | Beyer et al. | |
| 2006/0031204 A1 | 2/2006 | Liu et al. | |
| 2006/0047696 A1 | 3/2006 | Larson et al. | |
| 2006/0064487 A1 | 3/2006 | Ross | |
| 2006/0080646 A1 | 4/2006 | Aman | |
| 2006/0085592 A1 | 4/2006 | Ganguly et al. | |
| 2006/0089939 A1 | 4/2006 | Broda et al. | |
| 2006/0100957 A1 | 5/2006 | Buttler et al. | |
| 2006/0100969 A1 | 5/2006 | Wang et al. | |
| 2006/0106786 A1 | 5/2006 | Day et al. | |
| 2006/0106797 A1 | 5/2006 | Srinivasa et al. | |
| 2006/0129554 A1 | 6/2006 | Suyama et al. | |
| 2006/0155719 A1 | 7/2006 | Mihaeli et al. | |
| 2006/0166704 A1 | 7/2006 | Benco et al. | |
| 2006/0167704 A1 | 7/2006 | Nicholls et al. | |
| 2006/0167856 A1 | 7/2006 | Angele et al. | |
| 2006/0212441 A1 | 9/2006 | Tang et al. | |
| 2006/0224576 A1 | 10/2006 | Liu et al. | |
| 2006/0230029 A1 | 10/2006 | Yan | |
| 2006/0235840 A1 | 10/2006 | Manikutty et al. | |
| 2006/0242180 A1 | 10/2006 | Graf et al. | |
| 2006/0282429 A1 | 12/2006 | Hernandez-Sherrington et al. | |
| 2006/0294095 A1 | 12/2006 | Berk et al. | |
| 2007/0016467 A1 | 1/2007 | John et al. | |
| 2007/0022092 A1 | 1/2007 | Nishizawa et al. | |
| 2007/0039049 A1 | 2/2007 | Kupferman et al. | |
| 2007/0050340 A1 | 3/2007 | von Kaenel et al. | |
| 2007/0076314 A1 | 4/2007 | Rigney | |
| 2007/0118600 A1 | 5/2007 | Arora | |
| 2007/0136239 A1 | 6/2007 | Lee et al. | |
| 2007/0136254 A1 | 6/2007 | Choi et al. | |
| 2007/0156787 A1 | 7/2007 | MacGregor et al. | |
| 2007/0156964 A1* | 7/2007 | Sistla | G06F 12/121 711/133 |
| 2007/0192301 A1* | 8/2007 | Posner | G06F 17/30327 |
| 2007/0198479 A1 | 8/2007 | Cai et al. | |
| 2007/0214171 A1 | 9/2007 | Behnen et al. | |
| 2007/0226188 A1 | 9/2007 | Johnson et al. | |
| 2007/0226239 A1 | 9/2007 | Johnson et al. | |

(56) References Cited

U.S. PATENT DOCUMENTS

| | | |
|---|---|---|
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun et al. |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0228465 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennett |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri et al. |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishizawa et al. |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1 | 6/2010 | Mihaila et al. |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016123 A1 | 1/2011 | Pandey et al. |
| 2011/0016160 A1 | 1/2011 | Zhang et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1 | 2/2011 | Mason et al. |
| 2011/0040746 A1 | 2/2011 | Handa et al. |
| 2011/0055197 A1 | 3/2011 | Chavan |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0213802 A1 | 9/2011 | Singh et al. |
| 2011/0246445 A1 | 10/2011 | Mishra et al. |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1* | 12/2011 | Mejdrich ............ G06F 9/505 718/105 |
| 2012/0016866 A1 | 1/2012 | Dunagan et al. |
| 2012/0041934 A1 | 2/2012 | Srinivasan et al. |

(56) References Cited

U.S. PATENT DOCUMENTS

| | | |
|---|---|---|
| 2012/0072455 A1 | 3/2012 | Jain et al. |
| 2012/0116982 A1 | 5/2012 | Yoshida et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0237487 A1 | 8/2014 | Prasanna et al. |
| 2014/0324530 A1 | 10/2014 | Thompson et al. |
| 2014/0358959 A1 | 12/2014 | Bishnoi et al. |
| 2014/0379712 A1 | 12/2014 | Lafuente Alvarez |
| 2015/0007320 A1 | 1/2015 | Liu et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0127517 A1 | 5/2016 | Shcherbakov et al. |
| 2016/0140180 A1 | 5/2016 | Park et al. |
| 2016/0154855 A1 | 6/2016 | Hsiao et al. |
| 2017/0024912 A1 | 1/2017 | De Castro et al. |

FOREIGN PATENT DOCUMENTS

| | | |
|---|---|---|
| CN | 102665207 | 9/2012 |
| CN | 102892073 | 1/2013 |
| EP | 1241589 | 9/2002 |
| EP | 2474922 | 7/2012 |
| JP | 2002251233 | 9/2002 |
| JP | 2007328716 | 12/2007 |
| JP | 2008541225 | 11/2008 |
| JP | 2009134689 | 6/2009 |
| JP | 2010108073 | 5/2010 |
| JP | 2011039818 | 2/2011 |
| WO | 0049533 | 8/2000 |
| WO | 0118712 | 3/2001 |
| WO | 0159602 | 8/2001 |
| WO | 0165418 | 9/2001 |
| WO | 03030031 | 4/2003 |
| WO | 2007122347 | 11/2007 |
| WO | 2009119811 | 10/2009 |
| WO | 2010050582 | 5/2010 |
| WO | 2012037511 | 3/2012 |
| WO | 2012050582 | 4/2012 |
| WO | 2012154408 | 11/2012 |
| WO | WO2012158360 | 11/2012 |
| WO | 2015191120 | 12/2015 |
| WO | 2016048912 | 3/2016 |

OTHER PUBLICATIONS

Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.

Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.

Wang et al., Distributed continuous range query processing on moving objects, DEXA'06 Proceedings of the 17th international conference on Database and Expert Systems Applications, 2006, pp. 655-665.

Wu et al., Dynamic Data Management for Location Based Services in Mobile Environments, Database Engineering and Applications Symposium, 2003, Jul. 16, 2003, pp. 172-181.

International Application No. PCT/US2012/036353, International Preliminary Report on Patentability dated Nov. 28, 2013, 6 pages.

International Application No. PCT/US2012/036353, International Search Report and Written Opinion dated Sep. 12, 2012, 11 pages.

Non-Final Office Action for U.S. Appl. No. 13/107,742 dated Jun. 19, 2014, 20 pages.

Non-Final Office Action for U.S. Appl. No. 13/107,742 dated Jan. 21, 2015, 23 pages.

U.S. Appl. No. 13/107,742, Final Office Action dated Jul. 3, 2013, 19 pages.

U.S. Appl. No. 13/107,742, Non-Final Office Action dated Feb. 14, 2013, 16 pages.

U.S. Appl. No. 13/107,742, Notice of Allowance dated Jul. 8, 2015, 9 pages.

U.S. Appl. No. 14/883,815, Non-Final Office Action dated May 10, 2016, 32 pages.

U.S. Appl. No. 14/883,815, Notice of allowance dated Aug. 30, 2016, 13 pages.

Sadana "Interactive Scatterplot for Tablets," The 12th International Working Conference on Advanced Visual Interfaces, available from https://vimeo.com/97798460 (May 2014).

U.S. Appl. No. 13/830,428, Non-Final Office Action dated Mar. 22, 2017, 25 pages.

U.S. Appl. No. 13/830,502, Non-Final Office Action dated Apr. 7, 2017, 28 pages.

U.S. Appl. No. 14/036,500, Non-Final Office Action dated Feb. 9, 2017, 34 pages.

U.S. Appl. No. 14/079,538, Non-Final Office Action dated Mar. 31, 2017, 24 pages.

U.S. Appl. No. 13/830,735, Non-Final Office Action dated Apr. 4, 2017, 16 pages.

(56) References Cited

OTHER PUBLICATIONS

U.S. Appl. No. 15/177,147, Non-Final Office Action dated Apr. 7, 2017, 12 pages.
U.S. Appl. No. 14/866,512, Non-Final Office Action dated Apr. 10, 2017, 24 pages.
U.S. Appl. No. 14/610,971, Notice of Allowance dated Apr. 12, 2017, 11 pages.
China Patent Application No. CN201480030482.3, Office Action dated Feb. 4, 2017, 5 pages.
Oracle Application Server, Enterprise Deployment Guide, 1Og Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle, Jan. 2007, 376 pages.
Stream Query Repository: Online Auctions, at URL: http://www.db.stanford.edu/stream/sqr/onauc.html#queryspecsend, Dec. 2, 2002, 4 pages.
Oracle Application Server 10g, Release 2 and 3, New Features Overview, An Oracle White Paper, Oracle, Oct. 2005, 48 pages.
Oracle™ Complex Event Processing CQL Language Reference, 11g Release 1 (11.1.1.4.0) E12048-04, Jan. 2011, pp. 6.1 to 6.12.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
Caching Data with SQL DataSource Control, retrieved from the internet <URL:https://web.archive.org/web/2011 0704142936/http://msdn.microsoft.com/en-us/library/z56y8ksb(v=VS.1OO).aspx>, Jul. 4, 2011.
Call User Defined Functions from Pig, Amazon Elastic MapReduce, Mar. 2009, 2 pages.
Complex Event Processing in the Real World, an Oracle White Paper., Sep. 2007, 13 pages.
Coral8 Complex Event Processing Technology Overview, Coral8, Inc., Make it Continuous, Copyright 2007 Coral8, Inc., 2007, 1-8 pages.
Creating WebLogic Domains Using the Configuration Wizard, BEA Products, version 10.0, Dec. 2007, 78 pages.
Creating Weblogic Event Server Applications, BEA WebLogic Event Server, Version. 2.0, Jul. 2007, 90 pages.
Data stream management system, Wikipedia, downloaded from en.wikipedia.org/wiki/Data_stream_management_system, pp. 1-5.
Dependency Injection, Dec. 30, 2008, pp. 1-7.
Deploying Applications to WebLogic Server, Mar. 30, 2007, 164 pages.
Developing Applications with WebLogic Server, Mar. 30, 2007, 254 pages.
EPL Reference, BEA WebLogic Event Server, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs100/quickstart/quick_start.html, May 10, 2010, 1 page.
Getting Started with WebLogic Event Server, BEA WebLogic Event Server ver. 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, ver. 10.0, Mar. 30, 2007, 134 pages.
Map Reduce, Wikipedia, The Free Encyclopedia, 2016, 11 pages.
Matching Behavior, .NET Framework Developer's Guide, Microsoft Corporation, Retrieved on: Jul. 1, 2008, URL: http://msdn.microsoft.com/en-us/library/Oyzc2ybO(printer).aspx 2008, pp. 1-2.
Microsoft Computer Dictionary, 5th Edition, Microsoft Press, Redmond, WA, ©, 2002, pp. 238-239 and 529.
New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 11g Release 1 (11.1.1) E12048-01, Apr. 2010, 540 pages.
Oracle Complex Event Processing Exalogic Performance Study, http://www.oracle.com/technetwork!middleware/complex-event-processing/overview/cepexalogicwhitepaperfinal-498043.pdf, Sep. 2011, pp. 1-16.
Oracle Database, SQL Reference, 10g Release 1 (10.1), Part No. B10759-01, Dec. 2003, 2003, pp. 7-1 to 7-17; 7-287 to 7-290; 14-61 to 14-74.
Oracle Event Processing Hadoop Data Cartridge—11g Release 1 (11.1.1.7), Oracle Fusion Middleware CQL Language Reference for Oracle Event Processing 11 g Release 1 (11.1.1.7), retrieved from the Internet: URL:https:jjweb.archive.orgjweb/20130925035955/http://docs.oracle.comjcd/E2828001/apirefs.1111/e12048/datacarthadoo, Sep. 25, 2013, 4 pages.
Oracle Event Processing NoSQL Database Data Cartridge—11g Release 1(11.1.1. 7), Oracle Fusion Middleware CQL Language Reference for Oracle Event Processing 11g Release 1 (11.1.1.7), Sep. 25, 2013, 4 pages.
Oracle Fusion Middleware CQL Language Reference, 11g Release 1 (11.1.1.6.3), E1 2048-10, Aug. 2012, pp. 6-1 to 6-12.
Oracle® Complex Event Processing EPL Language Reference 11g Release 1 (11.1.1.4.0), E14304-02, Jan. 2011, 80 pages.
OSGI Service Platform Core Specification, The OSGI Alliance, OSGI Alliance, Apr. 2007, 288 pages.
Pattern Recognition With MATCH_RECOGNIZE, Oracle™ Complex Event Processing CQL Language Reference, 11g Release 1 (11.1.1) E12048-03, May 2009, pp. 15.1 to 15.20.
Pig (programming tool), Wikipedia, The Free Encyclopedia, 2016, 4 pages.
Release Notes, BEA WebLogic Event Server, Ver. 2.0, Jul. 2007, 8 pages.
SCD—Slowing Changing Dimensions in a Data Warehouse, retrieved from the internet <URL:https://web.archive.org/web/2011 0807085325/http:/!etl-tools.info/en/scd.html>, Aug. 7, 2011.
Spring Dynamic Modules for OSGi Service Platforms product documentation, Jan. 2008, 71 pages.
SQL Subqueries, retrieved from the internet <URL: https://web.archive.org/web/20111203033655/http:I/docs.oracle.com/cd/828359_01/server.111/b28286/queries007.htm>, Dec. 3, 2011.
SQL Tutorial-In, Tizag.com, http://web.archive.org/web/20090216215219/http://www.tizag.com/sqiTutorial/sqlin.php, Feb. 16, 2009, pp. 1-3.
Stream: The Stanford Stream Data Manager, retrieved from: URL: http://infolab.stanford.edu/stream/, May 5, 2006, pp. 1-9.
StreamBase New and Noteworthy, StreamBase, Jan. 12, 2010, 878 pages.

(56) References Cited

OTHER PUBLICATIONS

Strings in C, retrieved from the Internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
Supply Chain Event Management: Real-Time Supply Chain Event Management, product information Manhattan Associates, 2009-2012.
The Stanford Stream Data Manager, IEEE Data Engineering Bulletin. Mar. 2003, pp. 1-8.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebLogic Event Server Reference, BEA WebLogic Event Server, Version. 2.0, Jul. 2007, 52 pages.
WebLogic Server Performance and Tuning, BEA WebLogic Server, Ver. 10.0, Mar. 30, 2007, 180 pages.
WebSphere Application Server V6.1 Problem Determination: IBM Red paper Collection, Dec. 2007, 634 pages.
What is BPM, Datasheet [online] IBM, [retrieved on Jan. 28, 2013], retrieved from the Internet: <URL: http://www-01.ibm.com/software/info/bpm/whatis-bpm/>.
U.S. Appl. No. 10/948,523, Final Office Action dated Jul. 6, 2007, 37 pages.
U.S. Appl. No. 10/948,523, Non-Final Office Action dated Jan. 22, 2007, 32 pages.
U.S. Appl. No. 10/948,523, Non-Final Office Action dated Dec. 11, 2007, 48 pages.
U.S. Appl. No. 10/948,523, Notice of Allowance dated Dec. 1, 2010, 17 pages.
U.S. Appl. No. 10/948,523, Notice of Allowance dated Jul. 8, 2008, 5 pages.
U.S. Appl. No. 11/601,415, Final Office Action dated May 17, 2016, 17 pages.
U.S. Appl. No. 11/601,415, Final Office Action dated Oct. 6, 2014, 18 pages.
U.S. Appl. No. 11/601,415, Final Office Action dated May 27, 2009, 27 pages.
U.S. Appl. No. 11/601,415, Final Office Action dated Jun. 30, 2010, 45 pages.
U.S. Appl. No. 11/601,415, Final Office Action dated Jul. 2, 2012, 59 pages.
U.S. Appl. No. 11/601,415, Non-Final Office Action dated Sep. 17, 2008, 11 pages.
U.S. Appl. No. 11/601,415, Non-Final Office Action dated Nov. 13, 2015, 18 pages.
U.S. Appl. No. 11/601,415, Non-Final Office Action dated Nov. 30, 2009, 33 pages.
U.S. Appl. No. 11/601,415, Non-Final Office Action dated Dec. 9, 2011, 45 pages.
U.S. Appl. No. 11/601,415, Non-Final Office Action dated Dec. 11, 2013, 58 pages.
U.S. Appl. No. 11/873,407, Final Office Action dated Apr. 26, 2010, 12 pages.
U.S. Appl. No. 11/873,407, Non-Final Office Action dated Nov. 13, 2009, 8 pages.
U.S. Appl. No. 11/873,407, Notice of Allowance dated Nov. 10, 2010, 14 pages.
U.S. Appl. No. 11/873,407, Notice of Allowance dated Mar. 7, 2011, 8 pages.
U.S. Appl. No. 11/874,197, Final Office Action dated Jun. 29, 2010, 18 pages.
U.S. Appl. No. 11/874,197, Final Office Action dated Aug. 12, 2011, 22 pages.
U.S. Appl. No. 11/874,197, Non-Final Office Action dated Nov. 10, 2009, 15 pages.
U.S. Appl. No. 11/874,197, Non-Final Office Action dated Dec. 22, 2010, 23 pages.
U.S. Appl. No. 11/874,197, Notice of Allowance dated Jun. 22, 2012, 20 pages.
U.S. Appl. No. 11/874,202, Final Office Action dated Jun. 8, 2010, 18 pages.
U.S. Appl. No. 11/874,202, Non-Final Office Action dated Dec. 3, 2009, 15 pages.
U.S. Appl. No. 11/874,202, Notice of Allowance dated Dec. 22, 2010, 13 pages.
U.S. Appl. No. 11/874,202, Notice of Allowance dated Mar. 31, 2011, 8 pages.
U.S. Appl. No. 11/874,850, Notice of Allowance dated Nov. 24, 2009, 13 pages.
U.S. Appl. No. 11/874,896, Final Office Action dated Jul. 23, 2010, 25 pages.
U.S. Appl. No. 11/874,896, Non-Final Office Action dated Dec. 8, 2009, 16 pages.
U.S. Appl. No. 11/874,896, Non-Final Office Action dated Nov. 22, 2010, 26 pages.
U.S. Appl. No. 11/874,896, Notice of Allowance dated Jun. 23, 2011, 23 pages.
U.S. Appl. No. 11/927,681, Non-Final Office Action dated Mar. 24, 2011, 15 pages.
U.S. Appl. No. 11/927,681, Notice of Allowance dated Jul. 1, 2011, 8 pages.
U.S. Appl. No. 11/927,683, Final Office Action dated Sep. 1, 2011, 18 pages.
U.S. Appl. No. 11/927,683, Non-Final Office Action dated Mar. 24, 2011, 11 pages.
U.S. Appl. No. 11/927,683, Notice of Allowance dated Nov. 9, 2011, 7 pages.
U.S. Appl. No. 11/977,437, Final Office Action dated Apr. 8, 2010, 19 pages.
U.S. Appl. No. 11/977,437, Non-Final Office Action dated Oct. 13, 2009, 10 pages.
U.S. Appl. No. 11/977,437, Non-Final Office Action dated Aug. 3, 2012, 17 pages.
U.S. Appl. No. 11/977,437, Notice of Allowance dated Mar. 4, 2013, 10 pages.
U.S. Appl. No. 11/977,437, Notice of Allowance dated Jul. 10, 2013, 11 pages.
U.S. Appl. No. 11/977,439, Non-Final Office Action dated Apr. 13, 2010, 8 pages.
U.S. Appl. No. 11/977,439, Notice of Allowance dated Mar. 16, 2011, 10 pages.
U.S. Appl. No. 11/977,439, Notice of Allowance dated Aug. 18, 2010, 11 pages.
U.S. Appl. No. 11/977,439, Notice of Allowance dated Nov. 24, 2010, 8 pages.
U.S. Appl. No. 11/977,440, Notice of Allowance dated Oct. 7, 2009, 7 pages.
U.S. Appl. No. 12/395,871, Final Office Action dated Oct. 19, 2011, 9 pages.
U.S. Appl. No. 12/395,871, Non-Final Office Action dated May 27, 2011, 7 pages.
U.S. Appl. No. 12/395,871, Notice of Allowance dated May 4, 2012, 27 pages.
U.S. Appl. No. 12/396,008, Non-Final Office Action dated Jun. 8, 2011, 10 pages.
U.S. Appl. No. 12/396,008, Notice of Allowance dated Nov. 16, 2011, 5 pages.
U.S. Appl. No. 12/396,464, Final Office Action dated May 16, 2014, 16 pages.
U.S. Appl. No. 12/396,464, Final Office Action dated Jan. 16, 2013, 17 pages.
U.S. Appl. No. 12/396,464, Non Final Office Action dated Dec. 31, 2013, 16 pages.
U.S. Appl. No. 12/396,464, Non-Final Office Action dated Sep. 7, 2012, 18 pages.
U.S. Appl. No. 12/396,464, Notice of Allowance dated Sep. 3, 2014, 7 pages.
U.S. Appl. No. 12/506,891, Non-Final Office Action dated Dec. 14, 2011, 18 pages.

(56) References Cited

OTHER PUBLICATIONS

U.S. Appl. No. 12/506,891, Notice of Allowance dated Jul. 25, 2012, 8 pages.
U.S. Appl. No. 12/506,905, Final Office Action dated Aug. 9, 2012, 34 pages.
U.S. Appl. No. 12/506,905, Non-Final Office Action dated Mar. 26, 2012, 61 pages.
U.S. Appl. No. 12/506,905, Notice of Allowance dated Dec. 14, 2012, 9 pages.
U.S. Appl. No. 12/534,384, Final Office Action dated Feb. 12, 2013, 14 pages.
U.S. Appl. No. 12/534,384, Non-Final Office Action dated Feb. 28, 2012, 13 pages.
U.S. Appl. No. 12/534,384, Notice of Allowance dated May 7, 2013, 12 pages.
U.S. Appl. No. 12/534,398, Final Office Action dated Jun. 5, 2012, 17 pages.
U.S. Appl. No. 12/534,398, Non-Final Office Action dated Nov. 1, 2011, 15 pages.
U.S. Appl. No. 12/534,398, Notice of Allowance dated Nov. 27, 2012, 10 pages.
U.S. Appl. No. 12/548,187, Advisory Action dated Sep. 26, 2014, 6 pages.
U.S. Appl. No. 12/548,187, Final Office Action dated Jun. 10, 2013, 18 pages.
U.S. Appl. No. 12/548,187, Final Office Action dated Jun. 20, 2012, 22 pages.
U.S. Appl. No. 12/548,187, Final Office Action dated Jun. 4, 2014, 64 pages.
U.S. Appl. No. 12/548,187, Non Final Office Action dated Sep. 27, 2011, 19 pages.
U.S. Appl. No. 12/548,187, Non-Final Office Action dated Apr. 9, 2013, 17 pages.
U.S. Appl. No. 12/548,187, Non-Final Office Action dated Feb. 6, 2014, 54 pages.
U.S. Appl. No. 12/548,187, Notice of Allowability dated Feb. 2, 2016, 15 pages.
U.S. Appl. No. 12/548,187, Notice of Allowance dated Aug. 17, 2015, 18 pages.
U.S. Appl. No. 12/548,209, Non-Final Office Action dated Apr. 16, 2012, 17 pages.
U.S. Appl. No. 12/548,209, Notice of Allowance dated Oct. 24, 2012, 13 pages.
U.S. Appl. No. 12/548,222, Final Office Action dated Jun. 20, 2012, 20 pages.
U.S. Appl. No. 12/548,222, Non-Final Office Action dated Apr. 10, 2013, 16 pages.
U.S. Appl. No. 12/548,222, Non-Final Office Action dated Oct. 19, 2011, 19 pages.
U.S. Appl. No. 12/548,222, Notice of Allowance dated Jul. 18, 2013, 12 pages.
U.S. Appl. No. 12/548,281, Final Office Action dated Aug. 13, 2014, 19 pages.
U.S. Appl. No. 12/548,281, Final Office Action dated Jun. 20, 2012, 20 pages.
U.S. Appl. No. 12/548,281, Final Office Action dated Oct. 10, 2013, 21 pages.
U.S. Appl. No. 12/548,281, Non-Final Office Action dated Apr. 12, 2013, 16 pages.
U.S. Appl. No. 12/548,281, Non-Final Office Action dated Feb. 13, 2014, 16 pages.
U.S. Appl. No. 12/548,281, Non-Final Office Action dated Oct. 3, 2011, 20 pages.
U.S. Appl. No. 12/548,290, Final Office Action dated Jul. 30, 2012, 21 pages.
U.S. Appl. No. 12/548,290, Non-Final Office Action dated Apr. 15, 2013, 17 pages.
U.S. Appl. No. 12/548,290, Non-Final Office Action dated Oct. 3, 2011, 17 pages.
U.S. Appl. No. 12/548,290, Notice of Allowance dated Sep. 11, 2013, 6 pages.
U.S. Appl. No. 12/913,636, Final Office Action dated Jan. 8, 2013, 21 pages.
U.S. Appl. No. 12/913,636, Non-Final Office Action dated Jun. 7, 2012, 16 pages.
U.S. Appl. No. 12/913,636, Non-Final Office Action dated Apr. 1, 2015, 22 pages.
U.S. Appl. No. 12/913,636, Non-Final Office Action dated Jul. 24, 2014, 22 pages.
U.S. Appl. No. 12/913,636, Notice of Allowance dated Oct. 27, 2015, 22 pages.
U.S. Appl. No. 12/949,081, Final Office Action dated Aug. 27, 2013, 13 pages.
U.S. Appl. No. 12/949,081, Final Office Action dated Nov. 17, 2015, 19 pages.
U.S. Appl. No. 12/949,081, Non-Final Office Action dated Jan. 9, 2013, 13 pages.
U.S. Appl. No. 12/949,081, Non-Final Office Action dated Jan. 28, 2015, 20 pages.
U.S. Appl. No. 12/949,081, Notice of Allowance dated May 3, 2016, 6 pages.
U.S. Appl. No. 12/957,194, Non-Final Office Action dated Dec. 7, 2012, 13 pages.
U.S. Appl. No. 12/957,194, Notice of Allowance dated Mar. 20, 2013, 9 pages.
U.S. Appl. No. 12/957,201, Final Office Action dated Apr. 25, 2013, 11 pages.
U.S. Appl. No. 12/957,201, Non-Final Office Action dated Jul. 30, 2014, 12 pages.
U.S. Appl. No. 12/957,201, Non-Final Office Action dated Dec. 19, 2012, 15 pages.
U.S. Appl. No. 12/957,201, Notice of Allowance dated Jan. 21, 2015, 5 pages.
U.S. Appl. No. 13/089,556, Final Office Action dated Aug. 29, 2013, 10 pages.
U.S. Appl. No. 13/089,556, Final Office Action dated Jun. 13, 2014, 14 pages.
U.S. Appl. No. 13/089,556, Non-Final Office Action dated Apr. 10, 2013, 10 pages.
U.S. Appl. No. 13/089,556, Non-Final Office Action dated Nov. 6, 2012, 13 pages.
U.S. Appl. No. 13/089,556, Non-Final Office Action dated Jan. 9, 2014, 14 pages.
U.S. Appl. No. 13/089,556, Notice of Allowance dated Oct. 6, 2014, 7 pages.
U.S. Appl. No. 13/102,665, Final Office Action dated Jul. 9, 2013, 17 pages.
U.S. Appl. No. 13/102,665, Non-Final Office Action dated Feb. 1, 2013, 14 pages.
U.S. Appl. No. 13/102,665, Notice of Allowance dated Nov. 24, 2014, 9 pages.
U.S. Appl. No. 13/177,748, Final Office Action dated Mar. 20, 2014, 23 pages.
U.S. Appl. No. 13/177,748, Final Office Action dated Aug. 21, 2015, 24 pages.
U.S. Appl. No. 13/177,748, Non-Final Office Action dated Feb. 3, 2015, 22 pages.
U.S. Appl. No. 13/177,748, Non-Final Office Action dated Aug. 30, 2013, 25 pages.
U.S. Appl. No. 13/177,748, Notice of Allowance dated Jan. 6, 2016, 9 pages.
U.S. Appl. No. 13/184,528, Notice of Allowance dated Mar. 1, 2012, 11 pages.
U.S. Appl. No. 13/193,377, Final Office Action dated Jan. 17, 2013, 25 pages.
U.S. Appl. No. 13/193,377, Non-Final Office Action dated Aug. 23, 2012, 21 pages.
U.S. Appl. No. 13/193,377, Notice of Allowance dated Aug. 30, 2013, 19 pages.
U.S. Appl. No. 13/244,272, Final Office Action dated Mar. 28, 2013, 30 pages.

(56) References Cited

OTHER PUBLICATIONS

U.S. Appl. No. 13/244,272, Non-Final Office Action dated Oct. 4, 2012, 30 pages.
U.S. Appl. No. 13/244,272, Notice of Allowance dated Aug. 12, 2013, 12 pages.
U.S. Appl. No. 13/764,560, Final Office Action dated Apr. 15, 2015, 19 pages.
U.S. Appl. No. 13/764,560, Final Office Action dated Apr. 14, 2016, 20 pages.
U.S. Appl. No. 13/764,560, Non Final Office Action dated Sep. 12, 2014, 23 pages.
U.S. Appl. No. 13/764,560, Non-Final Office Action dated Oct. 6, 2015, 18 pages.
U.S. Appl. No. 13/770,961, Final Office Action dated Aug. 31, 2015, 28 pages.
U.S. Appl. No. 13/770,961, Non-Final Office Action dated Feb. 4, 2015, 22 pages.
U.S. Appl. No. 13/770,961, Notice of Allowance dated Apr. 4, 2016, 8 pages.
U.S. Appl. No. 13/770,969, Non-Final Office Action dated Aug. 7, 2014, 9 pages.
U.S. Appl. No. 13/770,969, Notice of Allowance dated Jan. 22, 2015, 5 pages.
U.S. Appl. No. 13/827,631, Final Office Action dated Apr. 3, 2015, 11 pages.
U.S. Appl. No. 13/827,631, Non Final Office Action dated Feb. 16, 2017, 16 pages.
U.S. Appl. No. 13/827,631, Non-Final Office Action dated Nov. 13, 2014, 10 pages.
U.S. Appl. No. 13/827,631, Non-Final Office Action dated Feb. 11, 2016, 12 pages.
U.S. Appl. No. 13/827,987, Final Office Action dated Jun. 19, 2015, 10 pages.
U.S. Appl. No. 13/827,987, Non-Final Office Action dated Nov. 6, 2014, 9 pages.
U.S. Appl. No. 13/827,987, Notice of Allowance dated Jan. 4, 2016, 16 pages.
U.S. Appl. No. 13/828,640, Final Office Action dated Jun. 17, 2015, 11 pages.
U.S. Appl. No. 13/828,640, Non-Final Office Action dated Dec. 2, 2014, 11 pages.
U.S. Appl. No. 13/828,640, Notice of Allowance dated Jan. 6, 2016, 16 pages.
U.S. Appl. No. 13/829,958, Final Office Action dated Jun. 19, 2015, 17 pages.
U.S. Appl. No. 13/829,958, Final Office Action dated Jun. 30, 2016, 19 pages.
U.S. Appl. No. 13/829,958, Non-Final Office Action dated Dec. 11, 2014, 15 pages.
U.S. Appl. No. 13/829,958, Non-Final Office Action dated Dec. 27, 2016, 20 pages.
U.S. Appl. No. 13/829,958, Non-Final Office Action dated Feb. 1, 2016, 20 pages.
U.S. Appl. No. 13/830,129, Non-Final Office Action dated Feb. 27, 2015, 19 pages.
U.S. Appl. No. 13/830,129, Notice of Allowance dated Sep. 22, 2015, 9 pages.
U.S. Appl. No. 13/830,378, Final Office Action dated Nov. 5, 2015, 28 pages.
U.S. Appl. No. 13/830,378, Non-Final Office Action dated Feb. 25, 2015, 23 pages.
U.S. Appl. No. 13/830,428, Final Office Action dated Jun. 4, 2015, 21 pages.
U.S. Appl. No. 13/830,428, Final Office Action dated May 26, 2016, 26 pages.
U.S. Appl. No. 13/830,428, Non-Final Office Action dated Dec. 5, 2014, 23 pages.
U.S. Appl. No. 13/830,428, Non-Final Office Action dated Jan. 5, 2016, 25 pages.
U.S. Appl. No. 13/830,502, Final Office Action dated Jun. 30, 2015, 25 pages.
U.S. Appl. No. 13/830,502, Final Office Action dated Jul. 6, 2016, 28 pages.
U.S. Appl. No. 13/830,502, Non-Final Office Action dated Nov. 20, 2014, 25 pages.
U.S. Appl. No. 13/830,502, Non-Final Office Action dated Dec. 11, 2015, 25 pages.
U.S. Appl. No. 13/830,735, Final Office Action dated Dec. 21, 2015, 20 pages.
U.S. Appl. No. 13/830,735, Non-Final Office Action dated May 26, 2015, 19 pages.
U.S. Appl. No. 13/830,759, Final Office Action dated Feb. 18, 2016, 18 pages.
U.S. Appl. No. 13/830,759, Non-Final Office Action dated Aug. 7, 2015, 23 pages.
U.S. Appl. No. 13/830,759, Non-Final Office Action dated Feb. 10, 2017, 23 pages.
U.S. Appl. No. 13/838,259, Final Office Action dated Feb. 19, 2016, 47 pages.
U.S. Appl. No. 13/838,259, Non-Final Office Action dated Oct. 24, 2014, 21 pages.
U.S. Appl. No. 13/838,259, Non-Final Office Action dated Jun. 9, 2015, 37 pages.
U.S. Appl. No. 13/838,259, Non-Final Office Action dated Jan. 4, 2017, 65 pages.
U.S. Appl. No. 13/839,288, Non-Final Office Action dated Dec. 4, 2014, 30 pages.
U.S. Appl. No. 13/839,288, Notice of Allowance dated Apr. 3, 2015, 12 pages.
U.S. Appl. No. 13/906,162, Final Office Action dated Jun. 10, 2015, 10 pages.
U.S. Appl. No. 13/906,162, Non-Final Office Action dated Dec. 29, 2014, 10 pages.
U.S. Appl. No. 13/906,162, Non-Final Office Action dated Oct. 28, 2015, 11 pages.
U.S. Appl. No. 13/906,162, Notice of Allowance dated Apr. 5, 2016, 7 pages.
U.S. Appl. No. 14/036,500, Final Office Action dated Mar. 17, 2016, 35 pages.
U.S. Appl. No. 14/036,500, Non-Final Office Action dated Aug. 14, 2015, 26 pages.
U.S. Appl. No. 14/036,659, Final Office Action dated Apr. 22, 2016, 38 pages.
U.S. Appl. No. 14/036,659, Non-Final Office Action dated Aug. 13, 2015, 33 pages.
U.S. Appl. No. 14/037,072, Non-Final Office Action dated Jul. 9, 2015, 12 pages.
U.S. Appl. No. 14/037,072, Notice of Allowance dated Feb. 16, 2016, 18 pages.
U.S. Appl. No. 14/037,153, Final Office Action dated Jan. 21, 2016, 31 pages.
U.S. Appl. No. 14/037,153, Non-Final Office Action dated Jun. 19, 2015, 23 pages.
U.S. Appl. No. 14/037,171, Non-Final Office Action dated Jun. 3, 2015, 15 pages.
U.S. Appl. No. 14/037,171, Notice of Allowance dated Oct. 15, 2015, 15 pages.
U.S. Appl. No. 14/077,230, Non-Final Office Action dated Dec. 4, 2014, 30 pages.
U.S. Appl. No. 14/077,230, Notice of Allowance dated Apr. 16, 2015, 16 pages.
U.S. Appl. No. 14/079,538, Final Office Action dated Jul. 27, 2016, 28 pages.
U.S. Appl. No. 14/079,538, Non-Final Office Action dated Oct. 22, 2015, 34 pages.
U.S. Appl. No. 14/302,031, Final Office Action dated Apr. 22, 2015, 23 pages.
U.S. Appl. No. 14/302,031, Non-Final Office Action dated Aug. 27, 2014, 19 pages.
U.S. Appl. No. 14/302,031, Notice of Allowance dated Nov. 3, 2015, 17 pages.

(56) References Cited

OTHER PUBLICATIONS

U.S. Appl. No. 14/559,550, Non-Final Office Action dated Jan. 27, 2017, 16 pages.
U.S. Appl. No. 14/621,098, Final Office Action dated Apr. 21, 2016, 16 pages.
U.S. Appl. No. 14/621,098, Non-Final Office Action dated Oct. 15, 2015, 21 pages.
U.S. Appl. No. 14/692,674, Non-Final Office Action dated Jun. 5, 2015, 10 pages.
U.S. Appl. No. 14/692,674, Notice of Allowance dated Oct. 15, 2015, 10 pages.
U.S. Appl. No. 15/015,933, Non-Final Office Action dated Jan. 30, 2017, 11 pages.
U.S. Appl. No. 15/360,650, Non-Final Office Action dated Mar. 9, 2017, 34 pages.
Abadi et al., Aurora: a new model and architecture for data stream management, The VLDB Journal The International Journal on Very Large Data Bases, vol. 12, No. 2, Jul. 16, 2003, pp. 120-139.
Abadi et al., Yes Aurora: A Data Stream Management System, International Conference on Management of Data, Proceedings of the 2003 ACM SIGMOD International Conference on Management of Data, 2003, 4 pages.
Agrawal et al., Efficient pattern matching over event streams, Proceedings of the 2008 ACM SIGMOD international conference on Management of data, Jun. 9-12, 2008, pp. 147-160.
Aho et al., Efficient String Matching: An Aid to Bibliographic Search, Communications of the ACM, vol. 18, No. 6, Association for Computing, Machinery, Inc., Jun. 1975, pp. 333-340.
Arasu et al., An Abstract Semantics and Concrete Language for Continuous Queries over Streams and Relations, 9th International Workshop on Database programming languages, Nov. 2002, pp. 1-12.
Arasu et al., CQL: A language for Continuous Queries over Streams and Relations, Lecture Notes in Computer Science , vol. 2921, 2004, pp. 1-19.
Arasu et al., Stream: The Stanford Data Stream Management System, Department of Computer Science, Stanford University, 2004, 21 pages.
Arasu et al., The CQL Continuous Query Language: Semantic Foundations and Query Execution, The VLDB Journal, vol. 15, No. 2, Jul. 22, 2005, pp. 121-142.
Avnur et al., Eddies: Continuously Adaptive Query Processing, In Proceedings of the 2000 ACM SIGMOD International Conference on Data, Dallas TX, May 2000, 12 pages.
Avnur et al., Eddies: Continuously Adaptive Query Processing, 2007, 4 pages.
Babock et al., Models and Issues in Data Streams, Proceedings of the 21st ACM SIGMOD-SIGACT-SIDART symposium on Principles database systems, 2002, 30 pages.
Babu et al., Continuous Queries over Data Streams, SIGMOD Record, vol. 30, No. 3, Sep. 2001, pp. 109-120.
Babu et al., Exploiting k-constraints to reduce memory overhead in continuous queries over data streams, ACM Transactions on Database Systems (TODS), vol. 29 Issue 3, from the internet <URL:http://dl.acm.org/citation.cfmid=1 016032>, Sep. 2004, 37 pages.
Bai et al., A Data Stream Language and System Designed for Power and Extensibility, Conference on Information and Knowledge Management, Proceedings of the 15th ACM D International Conference on Information and Knowledge Management, Arlington, Virginia, copyright 2006, ACM Press., Nov. 5-11, 2006, 10 pages.
Balkesen et al., Scalable Data Partitioning Techniques for Parallel Sliding Window Processing over Data Streams, 8th International Workshop on Data Management for Sensor Networks, Aug. 29, 2011, pp. 1-6.
Bestehorn, Fault-tolerant query processing in structured P2P-systems, Distributed and Parallel Databases, vol. 28, Issue 1, Aug. 2010, pp. 33-66.
Bose et al., A Query Algebra for Fragmented XML Stream Data, 9th International Conference on Data Base Programming Languages (DBPL), Sep. 2003, 11 pages.
Buza , Extension of CQL over Dynamic Databases, Journal of Universal Computer Science, vol. 12, No. 9, Sep. 2006, pp. 1165-1176.
Cadonna et al., Efficient event pattern matching with match windows, Proceedings of the 18th ACM SIGKDD international conference on Knowledge discovery and data mining, Aug. 2012, pp. 471-479.
Carpenter, User Defined Functions, Retrieved from: URL: http://www.sqlteam.comitemprint.aspItemID=979, Oct. 12, 2000, 4 pages.
Chan et al., Efficient Filtering of XML documents with Xpath expressions, 2002, pp. 354-379.
Chandramouli et al., High-Performance Dynamic Pattern Matching over Disordered Streams, Proceedings of the VLDB Endowment, vol. 3 Issue 1-2, Sep. 2010, pp. 220-231.
Chandrasekaran et al., PSoup: a system for streaming queries over streaming data, The VLDB Journal The International Journal on Very Large DataBases, vol. 12, No. 2, Aug. 1, 2003, pp. 140-156.
Chandrasekaran et al., TelegraphCQ: Continuous Dataflow Processing for an UncertainWorld, Proceedings of CIDR, 2003, 12 pages.
Chapple, Combining Query Results with the UNION Command, ask.com Computing Databases, downloaded from: http://databases.about.com/od/sql/a/union.htm, Apr. 28, 2009, 2 pages.
Chaudhuri et al., Variance Aware Optimization of Parameterized Queries, ACM SIGMOD, Jun. 2010, 12 pages.
Chen et al., NiagaraCQ: A Scalable Continuous Query System for Internet Databases, Proceedings of the 2000 SIGMOD International Conference on Management of Data, May 2000, pp. 379-390.
Chui, WebSphere Application Server V6.1—Class loader problem determination, IBM.com, 2007.
Chinese Application No. 201180053021.4, Office Action dated Oct. 28, 2015, 17 pages (8 pages for the original document and 9 pages for the English translation).
Chinese Application No. 201280022008.7, Office Action dated Dec. 3, 2015, 19 pages (9 pages for the original document and 10 pages for the English translation).
Colyer et al., Spring Dynamic Modules Reference Guide, Copyright, ver. 1.0.3, 2006-2008, 73 pages.
Colyer et al., Spring Dynamic Modules Reference Guide., Ver. 1.1.3, 2006-2008, 123 pages.
Conway, An Introduction to Data Stream Query Processing, Truviso Inc., May 24, 2007, 71 pages.
Cranor et al., Gigascope: a stream database for network applications, Proceedings of the 2003 ACM SIGMOD International Conference on Management of Data ' SIGMOD '03, Jun. 9, 2003, pp. 647-651.
De Castro Alves, A General Extension System for Event Processing Languages, DEBS '11, New York, USA, Jul. 11-15, 2011, pp. 1-9.
Demers et al., Towards Expressive Publish/Subscribe Systems, Proceedings of the 10th International Conference on Extending Database Technology (EDBT 2006),Munich, Germany, Mar. 2006, pp. 1-18.
Demichiel et al., JSR 220: Enterprise JavaBeans™, EJB 3.0 Simplified API, EJB 3.0 Expert Group, Sun Microsystems, Ver. 3.0, May 2, 2006, 59 pages.
Deshpande et al., Adaptive Query Processing, Slide show believed to be prior to Oct. 17, 2007, Oct. 17, 2007, 27 pages.
Dewson, Beginning SOL Server 2008 for Developers: From Novice to Professional, A Press, Berkeley, CA, 2008, pp. 337-349 and 418-438.
Diao et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
European Application No. 12783063.6, Extended European Search Report dated Mar. 24, 2015, 6 pages.

(56) References Cited

OTHER PUBLICATIONS

European Application No. 12783063.6, Office Action dated Nov. 11, 2015, 8 pages.
Fantozzi, A Strategic Approach to Supply Chain Event Management, Master of Engineering in Logistics at the Massachusetts Institute of Technology, Jun. 2003, pp. 1-36.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Florescu et al., The BEA/XQRL Streaming XQuery Processor, Proceedings of the 29th VLDB Conference, 2003, 12 pages.
Frank et al., Development and Evaluation of a Combined WLAN & Inertial Indoor Pedestrian Positioning System, Proceedings of the 22nd International Technical Meeting of the Satellite Division of the Institute of Navigation (ION GNSS 2009), Sep. 25, 2009, pp. 538-546.
Ghazal et al., Dynamic plan generation for parameterized queries, Proceedings of the 2009 ACM SIGMOD International Conference on Management of data, Jul. 2009, pp. 909-916.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.
Gosling et al., The Java Language Specification, 1996-2005, 684 pages.
Hao et al., Achieving high performance web applications by service and database replications at edge servers, Performance Computing and communications conference (IPCCC) IEEE 28th International, IEEE, Piscataway, NJ, USA, 2009, pp. 153-160.
Harish D et al., Identifying robust plans through plan diagram reduction, PVLDB '08, Auckland, New Zealand, Aug. 23-28, 2008, pp. 1124-1140.
Hasan et al., Towards unified and native enrichment in event processing systems, distributed event-based systems. ACM 2 Penn plaza suite 701 NY 10121-0701 USA, Jun. 29, 2013, pp. 171-182.
Hirzel et al., SPL Stream Processing Language Report, IBM Research Report RC24897 (W0911-044), Nov. 5, 2009, 19 pages.
Hopcroft, Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining., Aug. 2001, 10 pages.
Jin et al., ARGUS: Efficient Scalable Continuous Query Optimization for Large-Volume Data Streams, 10th International Database Engineering and Applications Symposium (IDEAS'06), 2006, 7 pages.
Josifovsky et al., Querying XML Streams, The VLDB Journal, vol. 14, 2005, pp. 197-210.
Japanese Application No. 2013-529376, Office Action dated Aug. 18, 2015, 2 pages.
Japanese Application No. 2014-509315, Office Action dated Mar. 15, 2016, 5 pages.
Katsov, In-Stream Big Data Processing: Highly Scalable Blog, Retrieved from the Internet: URL: https://web.archive.orgjweb/20140829054527/http://highlyscalable.wordpress.com/2013/08/20/in-stream-big-data-processing/, Aug. 29, 2014, 19 pages.
Katsov, In-Stream Big Data Processing : Highly Scalable Blog, Retrieved from the Internet: URL: https://highlyscalable.wordpress.com/2013/08/20/in-stream-big-data-processing/, Aug. 20, 2013, 20 pages.
Kawaguchi et al., Java Architecture for XML Binding (JAXB) 2.2, Sun Microsystems, Inc., Dec. 10, 2009, 384 pages.
Knuth et al., Fast Pattern Matching in Strings, Siam Journal of Computers, vol. 6(2), Jun. 1977, pp. 323-50.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011, pp. 1-6.
Kraemer, Continuous Queries Over Data Streams-Semantics and Implementation, Fachbereich Mathematik und Informatik der Philipps-Universitat Marburg, retrieved from the Internet: URL:http://archiv.ub.uni-marburg.de/dissjz2007/0671/pdfidjk.pdf, Jan. 1, 2007.
Kramer, Semantics and Implementation of Continuous Sliding Window Queries over Data Streams, ACM Transactions on Database Systems, vol. 34, Apr. 2009, pp. 4:1-4:49.
Kuwata et al., Stream Data Analysis Application for Customer Behavior with Complex Event Processing, IEICE Technical Report, The Institute of Electronics, Information and Communication Engineers, vol. 110, No. 107, Jun. 21, 2010, pp. 13-18.
Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd International Conference on Very Large Data Bases (VLDB), Sep. 2006, pp. 1106-1116.
Luckham, What's the Difference Between ESP and CEP, Complex Event Processing, downloaded, at URL:http://complexevents.com/p=103, Apr. 29, 2011, 5 pages.
Madden et al., Continuously Adaptive Continuous Queries (CACQ) over Streams, SIGMOD 2002, Jun. 4-6, 2002, 12 pages.
Martin et al., Finding Application Errors and Security Flaws Using PQL, a Program Query Language, OOPSLA'05, Oct. 16, 2005, pp. 1-19.
Motwani et al., Query Processing Resource Management, and Approximation in a Data Stream Management System, Proceedings of CIDR 2003, Jan. 2003, pp. 245-256.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nichols et al., A faster closure algorithm for pattern matching in partial-order event data, IEEE International Conference on Parallel and Distributed Systems, Dec. 2007, pp. 1-9.
Novick, Creating a User Defined Aggregate with SQL Server 2005, URL: http://novicksoftware.com/Articles/sql-2005-product-user-defined-aggregate.html, 2005, 6 pages.
Ogrodnek, Custom UDFs and hive, Bizo development blog http://dev.bizo.com, Jun. 23, 2009, 2 pages.
Olston et al., Pig Latin, A Not-So-Foreign Language for Data Processing, 2008, 12 pages.
International Application No. PCT/RU2015/000468, International Search Report and Written Opinion dated Apr. 25, 2016, 9 pages.
International Application No. PCT/US2011/052019, International Preliminary Report on Patentability dated Mar. 28, 2013, 6 pages.
International Application No. PCT/US2011/052019, International Search Report and Written Opinion dated Nov. 17, 2011, 9 pages.
International Application No. PCT/US2012/034970, International Preliminary Report on Patentability dated Nov. 21, 2013, 7 pages.
International Application No. PCT/US2012/034970, International Search Report and Written Opinion dated Jul. 16, 2012, 9 pages.
International Application No. PCT/US2013/062047, International Preliminary Report on Patentability dated Apr. 9, 2015, 10 pages.
International Application No. PCT/US2013/062047, International Search Report and Written Opinion dated Jul. 16, 2014, 12 pages.
International Application No. PCT/US2013/062050, International Search Report & Written Opinion dated Jul. 2, 2014, 13 pages.
International Application No. PCT/US2013/062052, International Preliminary Report on Patentability dated Apr. 9, 2015, 8 pages.
International Application No. PCT/US2013/062052, International Search Report & Written Opinion dated Jul. 3, 2014, 12 pages.
International Application No. PCT/US2013/073086, International Preliminary Report on Patentability dated Jun. 18, 2015, 6 pages.
International Application No. PCT/US2013/073086, International Search Report and Written Opinion dated Mar. 14, 2014, 9 pages.

(56) References Cited

OTHER PUBLICATIONS

International Application No. PCT/US2014/010832, International Search Report and Written Opinion dated Apr. 3, 2014, 8 pages.
International Application No. PCT/US2014/010832, Written Opinion dated Dec. 15, 2014, 5 pages.
International Application No. PCT/US2014/010920, International Preliminary Report on Patentability dated Jul. 29, 2015, 7 pages.
International Application No. PCT/US2014/010920, International Search Report and Written Opinion dated Dec. 15, 2014, 10 pages.
International Application No. PCT/US2014/017061, International Preliminary Report on Patentability dated May 28, 2015, 7 pages.
International Application No. PCT/US2014/017061, International Search Report dated Sep. 9, 2014, 4 pages.
International Application No. PCT/US2014/017061, Written Opinion dated Feb. 3, 2015, 6 pages.
International Application No. PCT/US2014/039771, International Preliminary Report on Patentability dated Jul. 29, 2015, 24 pages.
International Application No. PCT/US2014/039771, International Search Report and Written Opinion dated Sep. 24, 2014, 12 pages.
International Application No. PCT/US2014/039771, Written Opinion dated Apr. 29, 2015, 6 pages.
International Application No. PCT/US2014/068641, International Preliminary Report on Patentability dated Jun. 16, 2016, 7 pages.
International Application No. PCT/US2014/068641, International Search Report and Written Opinion dated Feb. 26, 2015, 11 pages.
International Application No. PCT/US2015/016346, International Search Report and Written Opinion dated May 4, 2015, 10 pages.
International Application No. PCT/US2015/016346, Written Opinion dated May 24, 2016, 5 pages.
International Application No. PCT/US2015/051268, International Preliminary Report on Patentability dated Dec. 8, 2016, 12 pages.
International Application No. PCT/US2015/051268, International Search Report and Written Opinion dated Dec. 15, 2015, 17 pages.
International Application No. PCT/US2015/051268, Written Opinion dated Aug. 18, 2016, 7 pages.
Peng et al., Xpath Queries on Streaming Data, 2003, pp. 1-12.
Peterson, Petri Net Theory and the Modeling of Systems, Prentice Hall, 1981, 301 pages.
PostgresSql, Documentation: Manuals: PostgreSQL 8.2: User-Defined Aggregates believed D to be prior to Apr. 21, 2007, 4 pages.
Pradhan, Implementing and Configuring SAP® Event Management, Galileo Press, 2010, pp. 17-21.
Purvee, Optimizing SPARQLeR Using Short Circuit Evaluation of Filter Clauses, Master of Science Thesis, Univ. of Georgia, Athens, GA, 2009, 66 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, IEEE 27th International Conference Data Engineering Workshops (ICDEW), Apr. 11, 2011, pp. 243-248.
Sadri et al., Expressing and Optimizing Sequence Queries in Database Systems, ACM Transactions on Database Systems, vol. 29, No. 2, ACM Press, Copyright 2004., Jun. 2004, 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle.corn, Oct. 9, 2003, 9 pages.
Seshadri et al., SmartCQL: Semantics to Handle Complex Queries over Data Streams, Wireless Communications Networking and Mobile Computing, Sep. 23-25, 2010, 5 pages.
Shah et al., Flux: an adaptive partitioning operator for continuous query systems, Proceedings of the 19th International Conference on Data Engineering, Mar. 5-8, 2003, pp. 25-36.
Sharaf et al., Efficient Scheduling of Heterogeneous Continuous Queries, VLDB '06, Sep. 12-15, 2006, pp. 511-522.
Stillger et al., LEO-DB2's Learning Optimizer, Proc. of the VLDB, Roma, Italy, Sep. 2001, pp. 19-28.
Stolze et al., User-defined Aggregate Functions in DB2 Universal Database, retrieved from: <http://www.128.ibm.com/deve10perworks/d b2/library/tachartic1e/0309stolze/0309stolze.html>, Sep. 11, 2003, pp. 1-11.
Stump et al., Proceedings, The 2006 Federated Logic Conference, IJCAR '06 Workshop, PLPV '06: Programming Languages meets Program Verification., 2006, pp. 1-113.
Takenaka et al., A scalable complex event processing framework for combination of SQL-based continuous queries and C/C++ functions, FPL 2012, Oslo, Norway, Aug. 29-31, 2012, pp. 237-242.
Terry et al., Continuous queries over append-only database, Proceedings of ACM SIGMOD, 1992, pp. 321-330.
Tho et al., Zero-latency data warehousing for heterogeneous data sources and continuous data streams, 5th International Conference on Information integration and Web-based Applications Services, Sep. 2003, 12 pages.
Tomàs et al., RoSeS: A Continuous Content-Based Query Engine for RSS Feeds, DEXA 2011, Toulouse, France, Sep. 2, 2011, pp. 203-218.
Ullman et al., Introduction to JDBC, Stanford University, 2005, 7 pages.
Vajjhala et al., The Java Architecture for XML Binding (JAXB) 2.0, Apr. 19, 2006, 384 pages.
W3C, XML Path Language (Xpath), W3C Recommendation, Version. 1.0, Retrieved from: URL: http://www.w3.org/TR/xpath, Nov. 16, 1999, 37 pages.
Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Weidong et al., LeoXSS: An Efficient XML Stream System for Processing Complex XPaths, CIT 2006, Seoul, Korea, 2006, 6 pages.
White et al., WebLogic Event Server: A Lightweight, Modular Application Server for Event Processing, Proceedings of the Second International Conference on Distributed Event-based systems, Jul. 2008, pp. 193-200.
Widom et al., CQL: A Language for Continuous Queries over Streams and Relations, Oct. 17, 2007, 62 pages.
Widom et al., The Stanford Data Stream Management System, PowerPoint Presentation, Oct. 17, 2007, 110 pages.
Wilson et al., SAP Event Management, an Overview, Q Data USA, Inc., 2009.
Yang et al., Map-Reduce-Merge, Simplified Relational Data Processing on Large Clusters, 2007, 12 pages.
Zemke, XML Query, H2 ad hoc subcommittee on SQL/XML, Mar. 2004, pp. 1-29.
U.S. Appl. No. 13/829,958, Final Office Action dated Jun. 26, 2017, 22 pages.
U.S. Appl. No. 13/830,378, Non-Final Office Action dated Jul. 5, 2017, 44 pages.
U.S. Appl. No. 13/838,259, Final Office Action dated Jul. 7, 2017, 69 pages.
U.S. Appl. No. 14/036,500, Notice of Allowance dated Jun. 30, 2017, 14 pages.
U.S. Appl. No. 14/036,659, Non-Final Office Action dated Jun. 2, 2017, 28 pages.
U.S. Appl. No. 14/559,550, Final Office Action dated Jul. 12, 2017, 21 pages.
U.S. Appl. No. 14/621,098, Notice of Allowance dated May 3, 2017, 9 pages.
U.S. Appl. No. 14/755,088, Non-Final Office Action dated Jun. 14, 2017, 13 pages.
U.S. Appl. No. 15/003,646, Notice of Allowance dated May 19, 2017, 16 pages.
U.S. Appl. No. 15/015,933, Notice of Allowance dated May 17, 2017, 16 pages.
Akama et al., Design and Evaluation of a Data Management System for WORM Data Processing, Journal of Information Processing, Information Processing Society of Japan, vol. 49, No. 2, Feb. 15, 2008, pp. 749-764.

(56) References Cited

OTHER PUBLICATIONS

Chinese Application No. 201380056012.X, Office Action dated Jun. 1, 2017, 22 pages (10 pages for the original document and 12 pages for the English translation).
Japanese Application No. 2015-534676, Office Action dated Jun. 27, 2017, 9 pages.

* cited by examiner

TRACKING LARGE NUMBERS OF MOVING OBJECTS IN AN EVENT PROCESSING SYSTEM

CROSS-REFERENCES TO RELATED APPLICATIONS

The present application is a continuation of, and claims the benefit of and priority to U.S. patent application Ser. No. 14/883,815, filed Oct. 15, 2015, and patented as U.S. Pat. No. 9,535,761 on Jan. 3, 2017, which is a continuation of U.S. patent application Ser. No. 13/107,742, filed May 13, 2011, and patented as U.S. Pat. No. 9,189,280, on Nov. 17, 2015, the entire contents of which are herein incorporated by reference for all purposes.

BACKGROUND

Embodiments of the present invention relate in general to event processing, and in particular to techniques for tracking large numbers of moving objects in an event processing system.

Traditional database management systems (DBMSs) execute queries in a "one-off" fashion over finite, stored data sets. For example, a traditional DBMS will receive a request to execute a query from a client, execute the query exactly once against one or more stored database tables, and return a result set to the client.

In recent years, event processing systems have been developed that can execute queries over streams of data rather than finite data sets. Since these streams (referred to herein as "event streams") can comprise a potentially unbounded sequence of input events, an event processing system can execute a query over the streams in a continuous (rather than one-off) manner. This allows the system to continually process new events as they are received. Based on this processing, the event processing system can provide an ongoing stream of results to a client. One example of such an event processing system is the Oracle Complex Event Processing (CEP) Server developed by Oracle Corporation.

Given their unique capabilities, event processing systems are well-suited for enabling applications that require real-time or near real-time processing of streaming data. For instance, event processing systems are particularly well-suited for building "spatial" applications (i.e., applications that require analysis of streams of spatial or geographic location data). Examples of such spatial applications include geographic information systems (GIS), location-enabled business intelligence solutions, geomatics/telematics applications, and the like. Some event processing systems, such as the Oracle CEP Server, provide an extension mechanism for supporting specific spatial features/operations (e.g., spatial data indexing, proximity and overlap determinations, etc.). Information regarding such an extension mechanism can be found in U.S. patent application Ser. No. 12/949,081, filed Nov. 18, 2010, titled "SPATIAL DATA CARTRIDGE FOR EVENT PROCESSING SYSTEMS," the entire contents of which are incorporated herein by reference for all purposes.

One limitation with existing event processing systems that allow spatial operations is that they generally cannot support the tracking of a very large number (e.g., greater than one million) of moving geometries or objects. For example, consider use cases from the telematics market where an application needs to (1) determine all of the vehicles impacted by certain traffic events, or (2) detect "buddies" close to a moving vehicle position, where there is an m to n relation between the number of vehicles and buddies using other vehicles. If the total number of vehicles in these use cases is in the range of millions, a conventional event processing system generally cannot index and keep track of all of the vehicles in an efficient manner.

BRIEF SUMMARY

Embodiments of the present invention provide techniques for tracking large numbers of moving objects in an event processing system. In one set of embodiments, an input event stream can be received, where the events in the input event stream represent the movement of a plurality of geometries or objects. The input event stream can then be partitioned among a number of processing nodes of the event processing system, thereby enabling parallel processing of one or more continuous queries for tracking the objects. In a particular embodiment, the partitioning can be performed such that (1) each processing node is configured to track objects in a predefined spatial region, and (2) the spatial regions for at least two nodes overlap. This overlapping window enables a single node to find, e.g., all of the objects within a particular distance of a target object, even if the target object is in the process of moving from the region of that node to the overlapping region of another node.

According to one embodiment of the present invention, a method is provided that includes receiving, by a computer system, an input event stream comprising a sequence of events, the sequence of events representing the movement of a plurality of objects. The method further includes partitioning, by the computer system, the input event stream among a plurality of processing nodes to facilitate parallel tracking of the objects, where each processing node is configured to track objects in a predefined spatial region, and where the predefined spatial regions for at least two processing nodes in the plurality of processing nodes overlap.

In one embodiment, each event includes an identifier of an object and a current position of the object.

In one embodiment, partitioning the input event stream includes, for each event, determining a subset of processing nodes in the plurality of processing nodes configured to track objects in a predefined spatial region that encompasses the current position of the object; and for each processing node in the plurality of processing nodes: determining whether the processing node is in the subset; if the processing node is in the subset, determining whether to insert or update the event in a relation operated on by the processing node; and if the processing node is not in the subset, determining whether to delete the event from the relation operated on by the processing node.

In one embodiment, determining whether to insert or update the event in the relation operated on by the processing node includes retrieving, from a bit vector stored for the processing node, a bit value associated with the object; if the bit value is zero, transmitting to the processing node a command for inserting the event into the relation and setting the bit value to one; and if the bit value is one, transmitting to the processing node a command for updating the event in the stream.

In one embodiment, determining whether to delete the event from the relation operated on by the processing node includes retrieving, from a bit vector stored for the processing node, a bit value associated with the object; and if the bit value is one, transmitting to the processing node a command for deleting the event from the relation and clearing the bit value to zero.

In one embodiment, the predefined spatial regions for the plurality of processing nodes are indexed using an R-tree index.

In one embodiment, determining the subset of processing nodes includes performing, based on the current position of the object, a search into the R-tree index.

In one embodiment, the computer system is a load balancing node of an event processing system.

In one embodiment, the sequence of events represent the movement of more than one million distinct objects.

In one embodiment, the plurality of objects are motor vehicles.

In one embodiment, the predefined spatial regions for the plurality of processing nodes are one-dimensional, two-dimensional, or three-dimensional regions.

According to another embodiment of the present invention, a non-transitory computer readable medium having stored thereon program code executable by a processor is provided. The program code includes code that causes the processor to receive an input event stream comprising a sequence of events, the sequence of events representing the movement of a plurality of objects; and code that causes the processor to partition the input event stream among a plurality of processing nodes to facilitate parallel tracking of the objects, where each processing node is configured to track objects in a predefined spatial region, and where the predefined spatial regions for at least two processing nodes in the plurality of processing nodes overlap.

According to another embodiment of the present invention, an event processing system that comprises a load balancer node and a plurality of processing nodes. The load balance node is configured to receive an input event stream comprising a sequence of events, the sequence of events representing the movement of a plurality of objects; and partition the input event stream among the plurality of processing nodes to facilitate parallel tracking of the objects, wherein each processing node is configured to track objects in a predefined spatial region, and wherein the predefined spatial regions for at least two processing nodes in the plurality of processing nodes overlap.

The foregoing, together with other features and embodiments, will become more apparent when referring to the following specification, claims, and accompanying drawings.

BRIEF DESCRIPTION

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for tracking large numbers of moving objects in an event processing system. In one set of embodiments, an input event stream can be received, where the events in the input event stream represent the movement of a plurality of geometries or objects. The input event stream can then be partitioned among a number of processing nodes of the event processing system, thereby enabling parallel processing of one or more continuous queries for tracking the objects. In a particular embodiment, the partitioning can be performed such that (1) each processing node is configured to track objects in a predefined spatial region, and (2) the spatial regions for at least two nodes overlap. This overlapping window enables a single node to find, e.g., all of the objects within a particular distance of a target object, even if the target object is in the process of moving from the region of that node to the overlapping region of another node.

Figure 1:
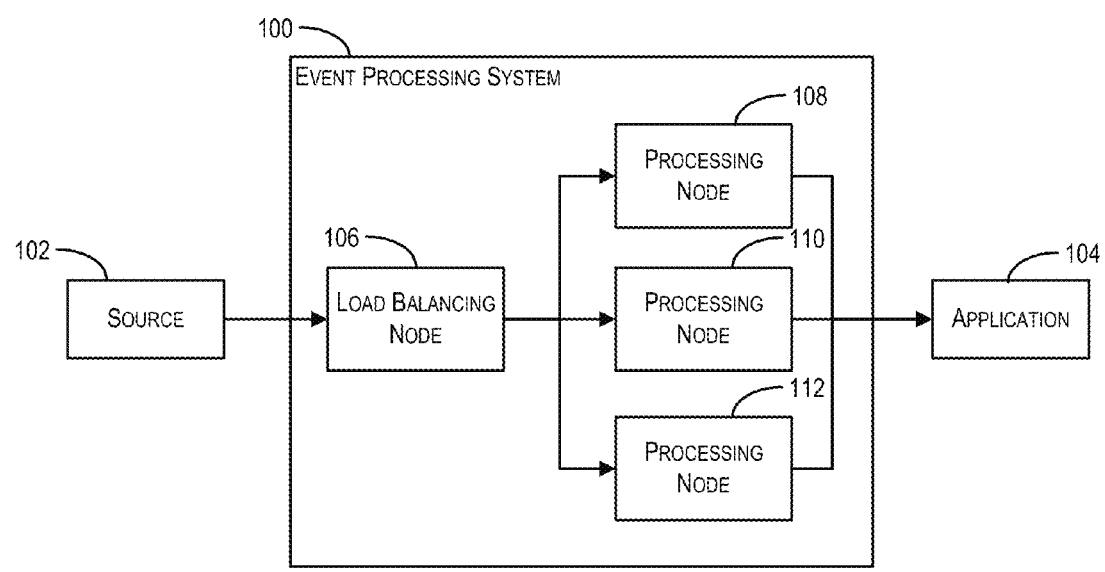
FIG. 1 is a simplified block diagram of an event processing system in accordance with an embodiment of the present invention.

FIG. 1 is a simplified block diagram of an event processing system 100 according to an embodiment of the present invention. Event processing system 100 can be implemented in hardware, software, or a combination thereof. Unlike traditional DBMSs, event processing system 100 can process queries (i.e., "continuous queries") in a continuous manner over potentially unbounded, real-time event streams. For example, event processing system 100 can receive one or more input event streams from a source (e.g., source 102), execute continuous queries against the input event streams, and generate one or more output event streams destined for a client (e.g., application 104). In a particular embodiment, event processing system 100 can include a mechanism (such as the spatial data cartridge described in U.S. patent application Ser. No. 12/949,081 titled "SPATIAL DATA CARTRIDGE FOR EVENT PROCESSING SYSTEMS") that enables the system to process continuous queries that reference spatial data types, method, fields, and the like.

As shown, event processing system 100 can include a load balancing node 106 and one or more processing nodes 108-112. Although only a single load balancing node and three processing nodes are depicted in FIG. 1, any number of such nodes can be supported.

In one set of embodiments, load balancing node 106 can be configured to partition an input event stream received from source 102 among processing nodes 108-112, thereby enabling the processing nodes to execute one or more continuous queries over the event stream in parallel. By way of example, if the input event stream comprises events E1 through E9, load balancing node 106 might decide to partition the stream such that events E1-E3 are handled by processing node 108, events E4-E6 are handled by processing node 110, and events E7-E9 are handled by processing node 112. In one embodiment, this partitioning can be accomplished by inserting, updating, or deleting events into/from relations maintained by each processing node.

In the context of a spatial application, the input event stream received by load balancing node 106 from source 102 can include events that correspond to the movement of a plurality of geometries or objects (e.g., people, motor vehicles, airplanes, etc.). In these embodiments, load balancing node 106 can partition the events among processing nodes 108-112 based on location information, such that each processing node is responsible for executing queries against a relation representing a predefined spatial region. In various embodiments, the predefined spatial region can be a one-dimensional, two-dimensional, or three-dimensional region. If the spatial application simply requires the identification of non-moving objects in an area of interest (e.g., a geo-fencing use case), the spatial regions handled by each processing node can be disjoint, and no special processing needs to be performed by load balancing node 106 to insert/update/delete events into the relations associated with the processing nodes—the relations will generally be static.

However, if the spatial application requires the tracking of moving objects across an area of interest, the spatial regions handled by adjacent processing nodes can overlap to some extent. This overlapping window enables a single processing node to find, e.g., all of the objects within a particular distance of a target object, even if the target object is in the process of moving from the region of that node to the overlapping region of another node. The processing performed by load balancing node 106 to enable partitioning across overlapping regions is described in greater detail below.

As described above, processing nodes 108-112 can each be configured to execute one more continuous queries over some partition or subset of the input event stream received from source 102. In the spatial context, processing nodes 108-112 can each be configured to execute one more continuous queries with respect to objects located in a predefined spatial region. Further, to accommodate the tracking of moving objects, the spatial regions for two more processing nodes can overlap. In one embodiment, processing nodes 108-112 can each correspond to a separate processor in a single machine. In other embodiments, processing nodes 108-112 can each correspond to an event processing server instance running on a separate machine.

It should be appreciated that event processing system 100 of FIG. 1 is illustrative and not intended to limit embodiments of the present invention. For example, event processing system 100 can have other capabilities or include other components that are not specifically described. One of ordinary skill in the art will recognize many variations, modifications, and alternatives.

Figure 2:
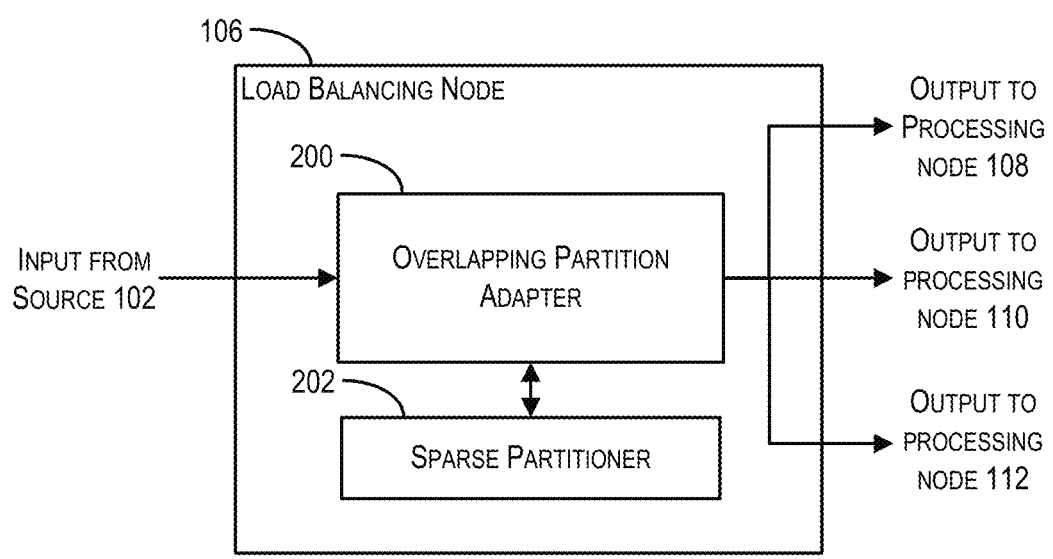
FIG. 2 is a simplified block diagram of a load balancing node in accordance with an embodiment of the present invention.

FIG. 2 is a simplified block diagram that illustrates a functional representation of load balancing node 106 according to an embodiment of the present invention. As shown, load balancing node 106 can include an overlapping partition adapter 200 and a sparse partitioner 202.

In various embodiments, overlapping partition adapter 200 is configured to receive input events from source 102 and efficiently partition the events among processing nodes 108-112 in a manner that takes into account overlapping regions between the processing nodes. By way of example, consider an object moving across a 2D area, where a first portion of the area is handled by processing node 108 and a second, overlapping portion of the area is handled by processing node 110. Assume that the object starts out at time T1 within the region handled by processing node 108, and at time T2 moves into the overlap area between node 108 and node 110. When this occurs, the event corresponding to the object should be inserted into the relation maintained by processing node 110 (so that it is "visible" to processing node 110), while also being updating in the relation maintained by processing node 108. Further, assume that the object moves at time T3 entirely into the region handled by node 110. At this point, the event corresponding to the object should be deleted from the relation maintained by node 108 while be updated in the relation maintained by node 110.

To accomplish the above, overlapping partition adapter 200 can carry out an algorithm in load balancing node 106 that appropriately inserts, updates, or deletes events to/from the relations maintained by processing nodes 108-112 to ensure that the processing nodes are correctly updated to track the movement of objects across the nodes. In certain cases, this algorithm can cause an event corresponding to an object to be inserted/updated in the relations of two or more processing nodes (if it is determined that the object is in an overlapping area between the nodes).

In a particular embodiment, overlapping partition adapter 200 can maintain a bit vector for each processing node, where each bit vector includes a bit entry for each unique object being processing by system 100. If the bit entry for a given object is set, that indicates that an event corresponding to the object was previously inserted into the relation being handled by the processing node (and it is still there). If the bit entry is not set, that indicates that an event corresponding to the object has not yet been inserted into (or was deleted from) the relation being handled by the processing node. These bit vectors allow overlapping partition adapter 200 to keep track of which processing nodes it has inserted events into, and which processing nodes it needs to update or delete a given event/object from. The details of the algorithm performed by overlapping partition adapter 200 (and how it updates these bit vectors) is described with respect to FIGS. 3-6 below.

Sparse partitioner 202 is an auxiliary component of load balancing node 106 that is configured to identify "participating" processing nodes for a given input event/object. In other words, sparse partitioner 202 can determine which processing nodes handle a spatial region that covers the current location of a given object. In various embodiments, overlapping partition adapter 200 can invoke sparse partitioner 202 to obtain a list of participating processing nodes for each input event or object and use the list within its partitioning algorithm.

In one set of embodiments, sparse partitioner 202 can maintain an Rtree index that indexes bounding rectangles associated with the processing nodes. Each bounding rectangle can represent the spatial region handled by a particular node. Accordingly, when an input event is received, sparse partitioner 202 can use the coordinates for the object associated with the event to perform a search into the Rtree index and return a list or array of processing nodes whose bounding rectangle covers the coordinates.

It should be appreciated that load balancing node 106 of FIG. 2 is illustrative and not intended to limit embodiments of the present invention. For example, load balancing node 106 can have other capabilities or include other components that are not specifically described. One of ordinary skill in the art will recognize many variations, modifications, and alternatives.

Figure 3:
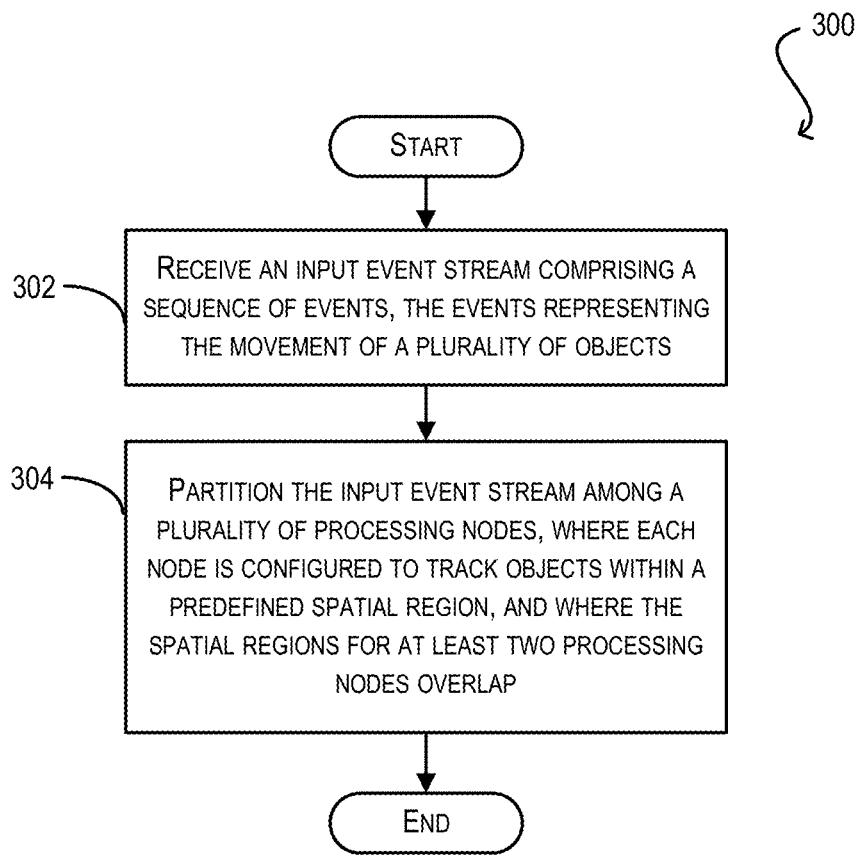
FIGS. 3-6 are flow diagrams of a process for partitioning an input event stream among a plurality of processing nodes in accordance with an embodiment of the present invention.

FIG. 3 is a flow diagram illustrating a process 300 for partitioning an input event stream among a plurality of processing nodes according to an embodiment of the present invention. In one set of embodiments, process 300 can be carried out by overlapping partition adapter 200 of FIG. 2. Process 300 can be implemented in hardware, software, or a combination thereof. As software, process 300 can be encoded as program code stored on a machine-readable storage medium.

At block 302, overlapping partition adapter 200 can receive an input event stream comprising a sequence of events, where the events represent the movement of a plurality of objects. For example, each event can include an identifier of an object, a current position (e.g., coordinates)

of the object, and a timestamp. In a particular embodiment, the events in the event stream can represent the movement of a very large number of objects (e.g., greater than one million).

At block 304, overlapping partition adapter 200 can partition the input event stream among a plurality of processing nodes (e.g., nodes 108-112 of FIG. 1), where each node is configured to track objects within a predefined spatial region, and where the spatial regions for at least two processing nodes overlap. As discussed above, this overlap enables a single node to find, e.g., all of the objects within a particular distance of a target object, even if the target object is in the process of moving from the region of that node to the overlapping region of another node.

Figure 4:
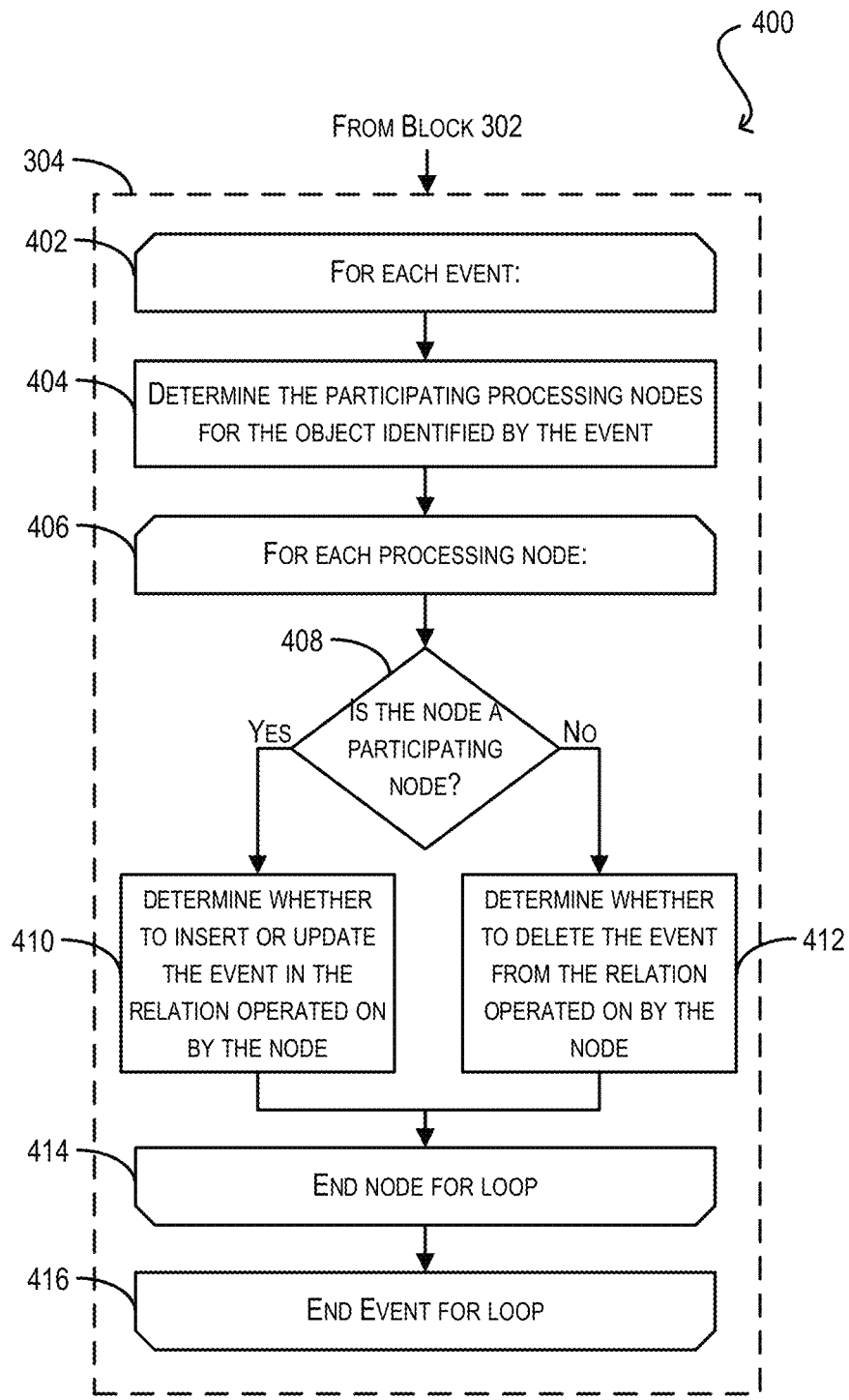

FIG. 4 illustrates a flow 400 that can be executed by overlapping partition adapter 200 as part of the processing of block 304 of FIG. 3. As shown in FIG. 4, for each event received in the event stream, overlapping partition adapter 200 can determine a list of participating processing nodes for the object identified in the event (blocks 402, 404). As discussed above, this determination can be carried out by passing the position of the object to sparse partitioner 202 of FIG. 2. Sparse partitioner 202 can then use the object's position to perform a search (e.g., an Rtree index search) of processing nodes whose spatial region covers the object's position.

Upon receiving the list of participating processing nodes from sparse partitioner 202, overlapping partition adapter 200 can iterate through all of the processing nodes in the system and determine whether a given node is a participating node (e.g., is in the list returned by sparse partitioner 202) (blocks 406, 408). If a given node is a participating node, that means the object identified by the current event should be tracked by the node. Accordingly, overlapping partition adapter 200 can determine whether to insert or update the event into the relation maintained by the node (block 410). If the node is not a participating node, that means the object identified by the event should not (or should no longer) be tracked by the node. Accordingly, overlapping partition adapter 200 can determine whether to delete the event from the relation maintained by the node (block 412).

Once the determination at block 410 or 412 is made, overlapping partition adapter 200 can continue to iterate through all of the processing nodes, and repeat this loop for each incoming event (blocks 414, 416).

Figure 5:
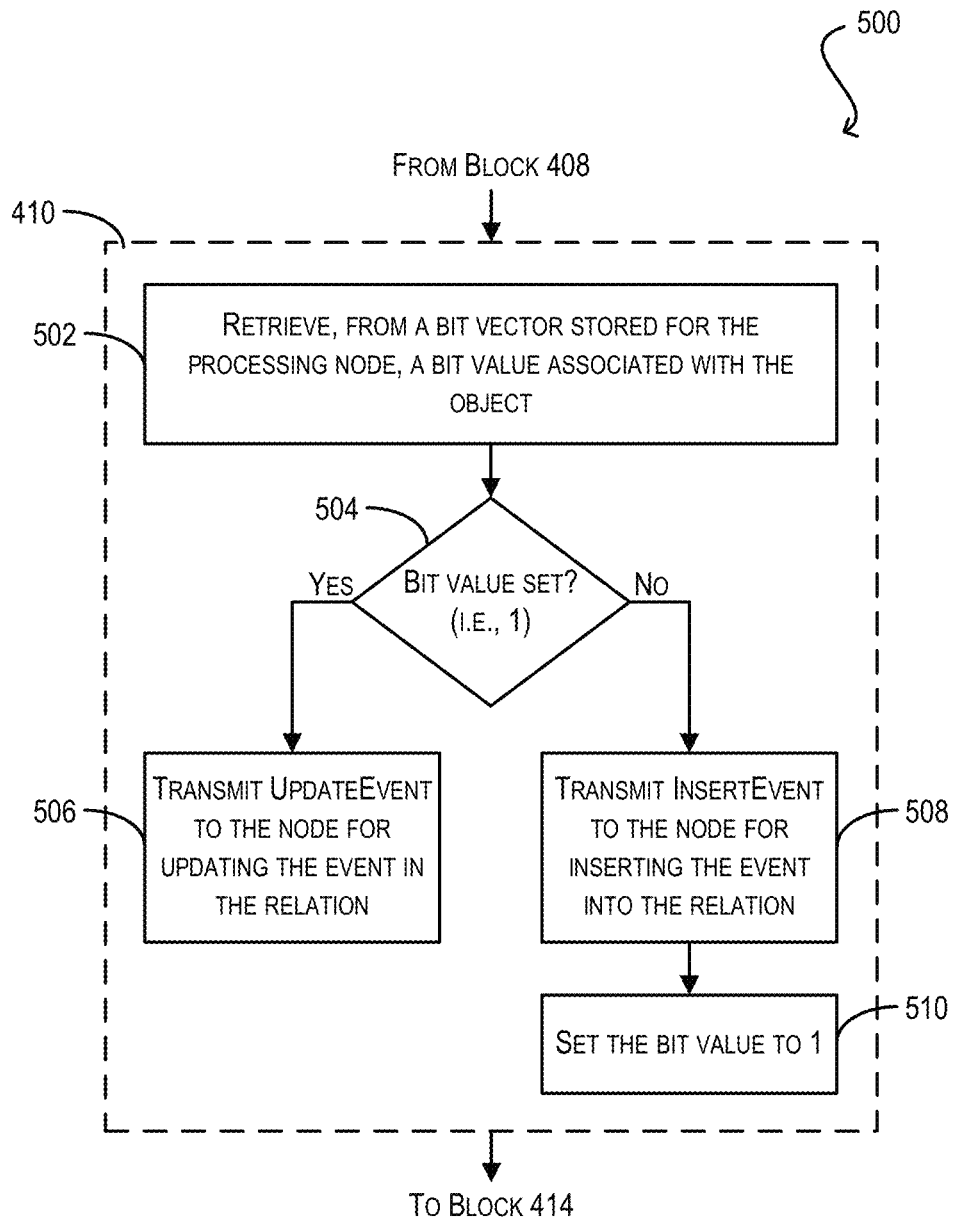

FIG. 5 illustrates a flow 500 that can be executed by overlapping partition adapter 200 as part of the processing of block 410 of FIG. 4. At block 502, overlapping partition adapter 200 can retrieve, from a bit vector stored for the current processing node, a bit value associated with the current object. As discussed above with respect to FIG. 2, a bit vector is stored for each processing node in the system and reflects which objects are currently being tracked by the node.

If the bit value for the object is set (i.e., has a value of one), overlapping partition adapter 200 can transmit an updateevent command to the processing node for updating the event in the relation (blocks 504, 506). If the bit value for the object is not set (i.e., has a value of zero), overlapping partition adapter 200 can transmit an insertevent command to the processing node for inserting the event into the relation (blocks 504, 508). Adapter 200 can then set the bit value (i.e., change the value to one) to indicate that the processing node is now tracking the object (block 510).

Figure 6:
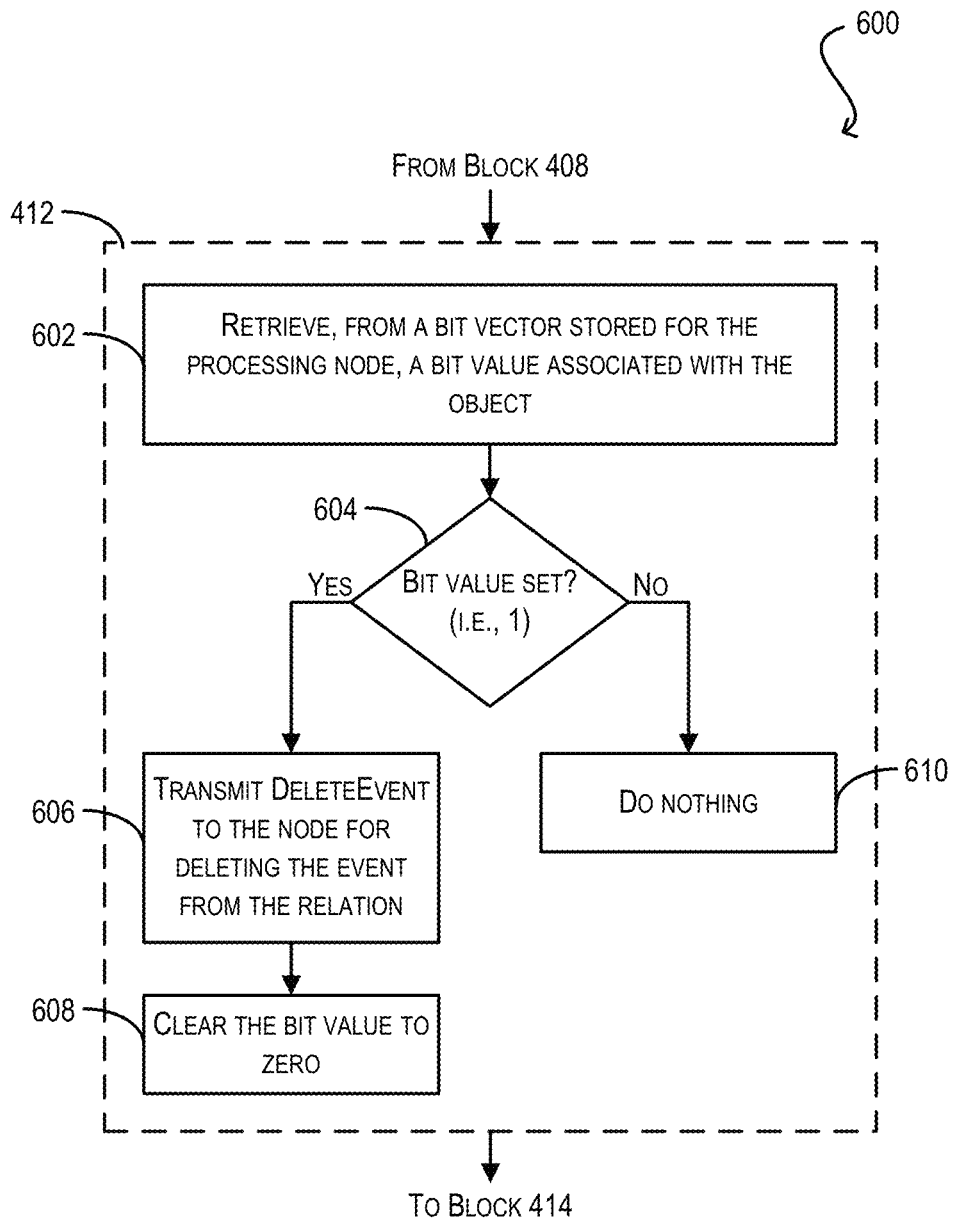

FIG. 6 illustrates a flow 600 that can be executed by overlapping partition adapter 200 as part of the processing of block 412 of FIG. 4. Like block 502 of FIG. 5, overlapping partition adapter 200 can retrieve, from a bit vector stored for the current processing node, a bit value associated with the current object (block 602). If the bit value for the object is set (i.e., has a value of one), overlapping partition adapter 200 can transmit a deleteevent command to the processing node for deleting the event in the relation (blocks 604, 606). The adapter can then clear the bit value (i.e., change the value to zero) to indicate that the processing node is no longer tracking the object (block 608). If the bit value for the object is not set (i.e., has a value of zero), overlapping partition adapter 200 can do nothing (block 610).

It should be appreciated that the flow diagrams depicted in FIGS. 3-6 are illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Using the techniques described above, embodiments of the present invention can support very large scale moving object tracking in an event processing system (e.g., greater than one million objects), while using a relatively small amount of working memory. For example, only 128 Kilobytes of memory are needed per processing node (for the bit vector) for handling one million unique moving objects. Further, note that the module for identifying participating nodes (i.e., sparse partitioner 202) is separate from the insert/update/delete event processing performed by overlapping partition adapter 200. Accordingly different types of partitioning policies can be plugged into the system to support different spatial use cases.

Figure 7:
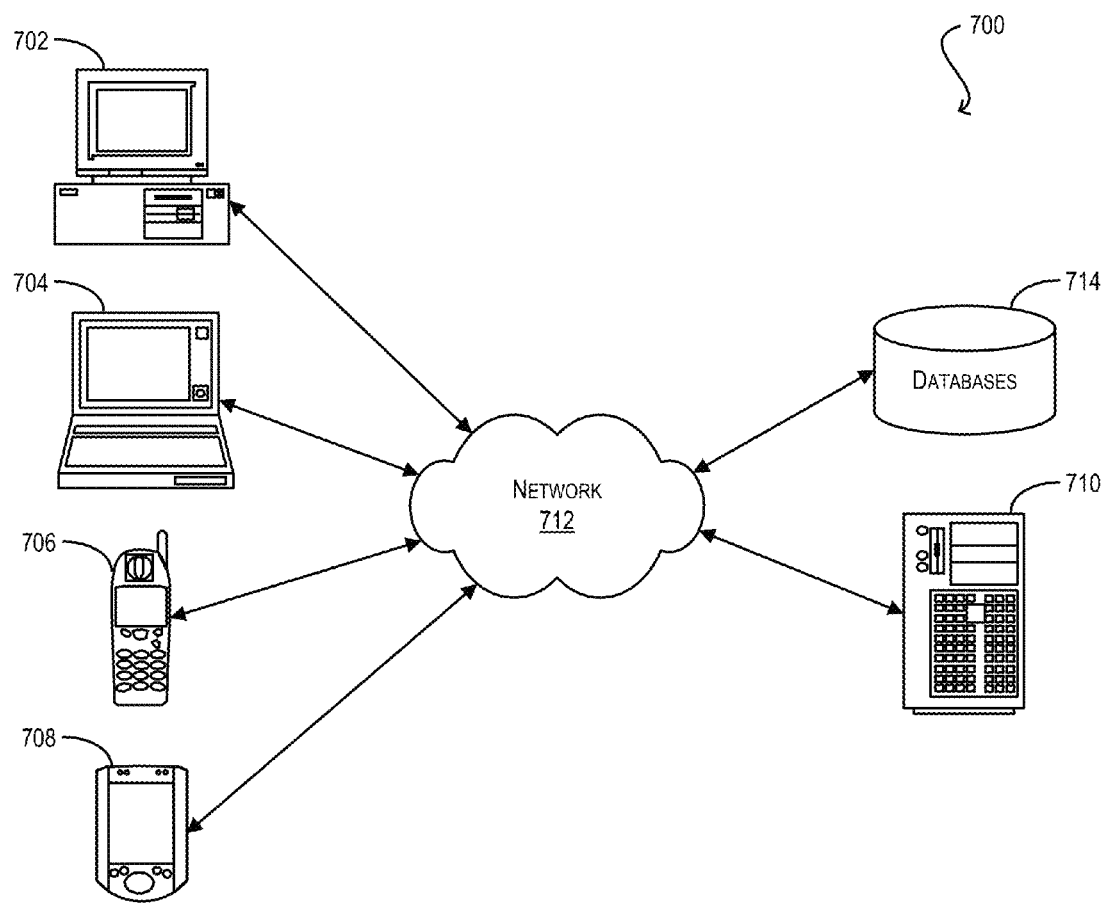
FIG. 7 is a simplified block diagram of a system environment in accordance with an embodiment of the present invention.

FIG. 7 is a simplified block diagram illustrating a system environment 700 that can be used in accordance with an embodiment of the present invention. As shown, system environment 700 can include one or more client computing devices 702, 704, 706, 708, which can be configured to operate a client application such as a web browser, a UNIX/SOLARIS terminal application, and/or the like. In one set of embodiments, client computing devices 702, 704, 706, 708 may be configured to run one or more client applications that interact with event processing system 100 of FIG. 1.

Client computing devices 702, 704, 706, 708 can be general purpose personal computers (e.g., personal computers and/or laptop computers running various versions of MICROSOFT WINDOWS and/or APPLE MACINTOSH operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, 708 can be any other electronic device capable of communicating over a network, such as network 712 described below. Although system environment 700 is shown with four client computing devices, it should be appreciated that any number of client computing devices can be supported.

System environment 700 can further include a network 712. Network 712 can be any type of network familiar to those skilled in the art that can support data communications using a network protocol, such as TCP/IP, SNA, IPX, AppleTalk, and the like. Merely by way of example, network 712 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 can further include one or more server computers 710 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 710 can run an operating system including any of those discussed above, as well as any commercially available server operating system. Server 710 can also run any of a variety of server applications and/or mid-tier applications, including web servers, FTP servers, CGI servers, JAVA virtual machines, and the like. In one set of embodiments, server 710 may correspond to a machine configured to run event processing system 100 of FIG. 1.

System environment 700 can further include one or more databases 714. In one set of embodiments, databases 714 can include databases that are managed by server 710 (e.g., database 108 of FIG. 1). Databases 714 can reside in a variety of locations. By way of example, databases 714 can reside on a storage medium local to (and/or resident in) one or more of computers 702, 704, 706, 708, and 710. Alternatively, databases 714 can be remote from any or all of computers 702, 704, 706, 708, and 710, and/or in communication (e.g., via network 712) with one or more of these. In one set of embodiments, databases 714 can reside in a storage-area network (SAN) familiar to those skilled in the art.

Figure 8:
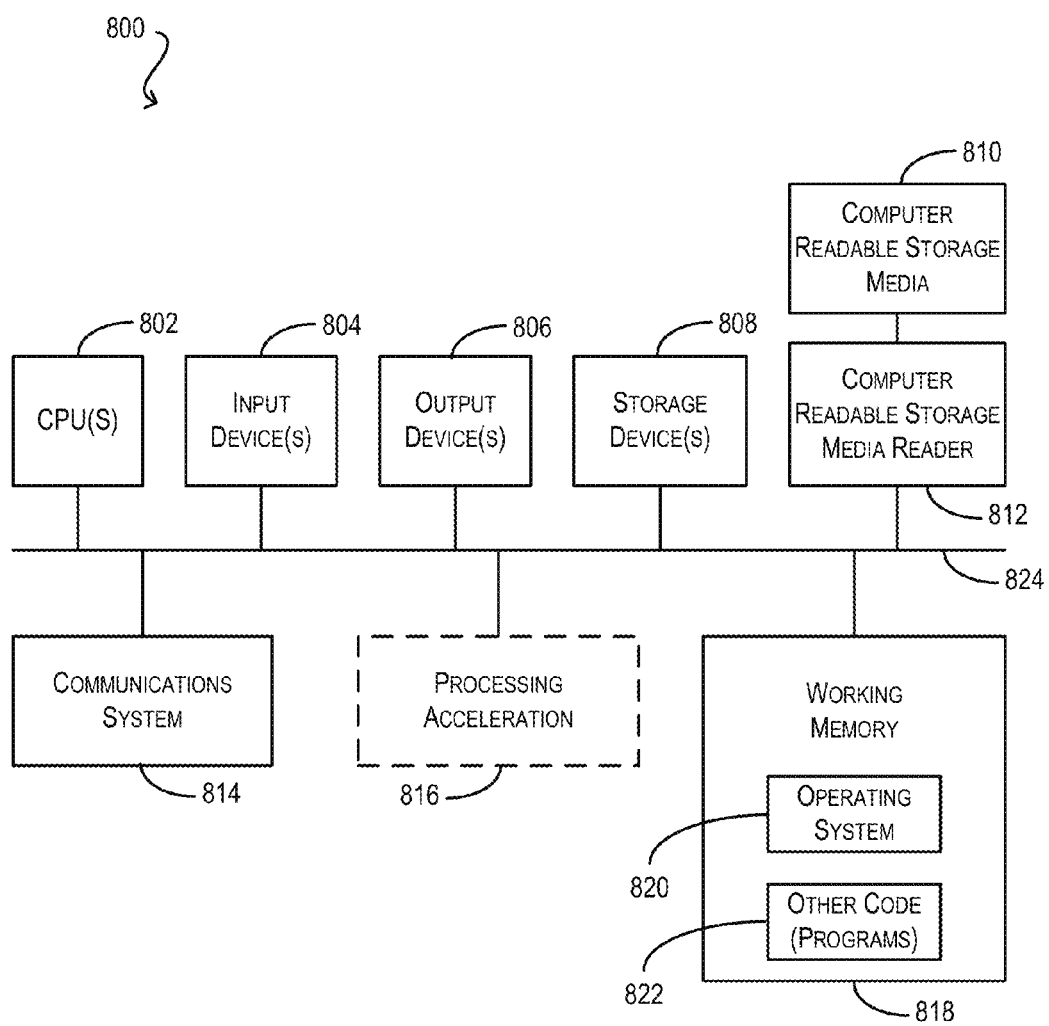
FIG. 8 is a simplified block diagram of a computer system in accordance with an embodiment of the present invention.

FIG. 8 is a simplified block diagram illustrating a computer system 800 that can be used in accordance with an embodiment of the present invention. In various embodiments, computer system 800 can be used to implement any of computers 702, 704, 706, 708, and 710 described with respect to system environment 700 above. As shown, computer system 800 can include hardware elements that are electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 can permit data to be exchanged with network 712 and/or any other computer described above with respect to system environment 700.

Computer system 800 can also comprise software elements, shown as being currently located within working memory 818, including an operating system 820 and/or other code 822, such as an application program (which may be a client application, Web browser, middle tier/server application, etc.). It should be appreciated that alternative embodiments of computer system 800 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 800 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, embodiments of the present invention are not restricted to operation within certain specific data processing environments, but are free to operate within a plurality of data processing environments. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
    receiving, by a computer system, an input event stream comprising a sequence of events, the sequence of events representing movement of a plurality of objects, the input event stream including a first event of the sequence of events, and the first event being associated with a first object of the plurality of objects;
    partitioning, by the computer system, the input event stream among a plurality of processing nodes to facilitate parallel tracking of the plurality of objects using a plurality of bit vectors that correspond to the plurality of processing nodes, each of the plurality of bit vectors comprising a plurality of bit values corresponding to the plurality of objects, and the partitioning of the input event stream comprising, for each event in the sequence of events:

determining, by the computer system using a first bit value of a first bit vector of the plurality of bit vectors that is associated with a first processing node of the plurality of processing nodes, that the first processing node is not currently tracking the first object of the plurality of objects, the first bit value being associated with the first object;

changing, by the computer system, the first bit value from a first value to a second value that is different than the first value; and transmitting, by the computer system, a command to the first processing node for inserting the first event into a first spatial-region-representing relation that is operated upon by the first processing node.

2. The method of claim 1, wherein:

the plurality of processing nodes operate upon a plurality of spatial-region-representing relations, the plurality of spatial-region-representing relations including the first spatial-region-representing relation;

each event of the sequence of events includes an identifier of the associated object and a current spatial position of the object; and the partitioning the input event stream comprises, for each event:

determining a subset of processing nodes in the plurality of processing nodes configured to track objects in a predefined spatial region that encompasses the current position of the object; and for each processing node in the plurality of processing nodes:

determining whether the processing node is in the subset;

when the processing node is in the subset, determining whether to cause the event to be inserted or updated in the first spatial-region-representing relation operated on by the processing node; and when the processing node is not in the subset, determining whether to cause the event to be deleted from the first spatial-region-representing relation operated on by the processing node.

3. The method of claim 2, wherein determining whether to cause the event to be inserted or updated in the first spatial-region-representing relation operated on by the processing node comprises:

retrieving, from a bit vector associated with the processing node, a bit value associated with the object;

when the bit value is the first value:
transmitting to the processing node a command for inserting the event into the first spatial-region-representing relation; and
setting the bit value to the second value; and when the bit value is the second value, transmitting a command to the processing node for updating the event in the first spatial-region-representing relation.

4. The method of claim 3, wherein determining whether to cause the event to be inserted or updated further comprises transmitting to the processing node, a command for inserting the event into the first spatial-region-representing relation if the bit value is zero and transmitting to the processing node, a command for updating the event in the stream if the bit value is one.

5. The method of claim 2, wherein determining whether to delete the event from the relation operated on by the processing node comprises:

retrieving, from a bit vector stored for the processing node, a bit value associated with the object; and when the bit value is the second value:
transmitting to the processing node a command for deleting the event from the relation; and
setting the bit value to the first value.

6. The method of claim 2, wherein determining whether to delete the event from the relation operated on by the processing node further comprises:

retrieving, from a bit vector stored for the processing node, a bit value associated with the object; and if the bit value is one:
transmitting to the processing node a command for deleting the event from the relation; and
clearing the bit value to zero.

7. The method of claim 1, wherein partitioning the input event stream further comprises:

prior to the changing the first bit value, identifying, by the computer system, from the first bit vector corresponding to the first processing node, the first bit value; and determining, by the computer system, a type of the command to be sent to the first processing node based on the first bit value.

8. The method of claim 1, wherein the input event stream further includes a second event of the sequence of events that is also associated with the first object, wherein the partitioning further includes:

determining, by the computer system, using a second bit value of the first bit vector, that the first processing node is currently tracking the first object;

changing, by the computer system, the first bit value from the second value to the first value; and transmitting, by the computer system, another command to the first processing node for deleting one or more events associated with the first object from the first spatial-region-representing relation operated upon by the first processing node.

9. The method of claim 1, wherein the computer system is a load balancing node of an event processing system.

10. The method of claim 1, wherein the plurality of objects are motor vehicles.

11. The method of claim 1, wherein each processing node of the plurality of processing nodes is configured to track an object in the plurality of objects in a predefined spatial region, and wherein the predefined spatial region for at least two processing nodes in the plurality of processing nodes overlap, wherein the predefined spatial regions for the plurality of processing nodes are one-dimensional, two-dimensional, or three-dimensional regions.

12. A non-transitory computer readable medium having stored thereon program code executable by a processor, the program code comprising:

code that causes the processor to receive an input event stream comprising a sequence of events, the sequence of events representing movement of a plurality of objects, the input event stream including a first event of the sequence of events, and the first event being associated with a first object of the plurality of objects;

code that causes the processor to partition the input event stream among a plurality of processing nodes to facilitate parallel tracking of the plurality of objects using a plurality of bit vectors that correspond to the plurality of processing nodes, each of the plurality of bit vectors comprising a plurality of bit values corresponding to the plurality of objects, and the code that causes the processor to partition the input event stream comprises, for each event in the sequence of events:

code that causes the processor to determine using a first bit value of a first bit vector of the plurality of bit vectors that is associated with a first processing node of the plurality of processing nodes, that the first processing node is not currently tracking the first object of the plurality of objects, the first bit value being associated with the first object;

code that causes the processor to change the first bit value from a first value to a second value that is different than the first value; and code that causes the processor to transmit a command to the first processing node for inserting the first event into a first spatial-region-representing relation that is operated upon by the first processing node.

13. The non-transitory computer readable medium of claim 12, wherein the code that causes the processor to partition the input event stream further comprises:

prior to the changing the first bit value, code that causes the processor to identify from the first bit vector corresponding to the first processing node, the first bit value; and code that causes the processor to determine a type of the command to be sent to the first processing node based on the first bit value.

14. The non-transitory computer readable medium of claim 12, wherein the input event stream further includes a second event of the sequence of events that is also associated with the first object, wherein the code that causes the processor to partition the input event stream further includes:

code that causes the processor to determine using a second bit value of the first bit vector, that the first processing node is currently tracking the first object;

code that causes the processor to change the first bit value from the second value to the first value; and code that causes the processor to transmit another command to the first processing node for deleting one or more events associated with the first object from the first spatial-region-representing relation operated upon by the first processing node.

15. The non-transitory computer readable medium of claim 12, wherein the plurality of objects are motor vehicles.

16. An event processing system comprising:

a load balancer node; and a plurality of processing nodes, wherein the load balancer node is configured to:

receive an input event stream comprising a sequence of events, the sequence of events representing movement of a plurality of objects, the input event stream including a first event of the sequence of events, and the first event being associated with a first object of the plurality of objects;

partition the input event stream among a plurality of processing nodes to facilitate parallel tracking of the plurality of objects using a plurality of bit vectors that correspond to the plurality of processing nodes, each of the plurality of bit vectors comprising a plurality of bit values corresponding to the plurality of objects, and the partitioning of the input event stream comprising, for each event in the sequence of events:

determining, by the computer system using a first bit value of a first bit vector of the plurality of bit vectors that is associated with a first processing node of the plurality of processing nodes, that the first processing node is not currently tracking the first object of the plurality of objects, the first bit value being associated with the first object;

changing, by the computer system, the first bit value from a first value to a second value that is different than the first value; and transmitting, by the computer system, a command to the first processing node for inserting the first event into a first spatial-region-representing relation that is operated upon by the first processing node.

17. The event processing system of claim 16, wherein partitioning the input event stream further comprises:

prior to the changing the first bit value, identifying, by the computer system, from the first bit vector corresponding to the first processing node, the first bit value; and determining, by the computer system, a type of the command to be sent to the first processing node based on the first bit value.

18. The event processing system of claim 16, wherein the input event stream further includes a second event of the sequence of events that is also associated with the first object, wherein the partitioning further includes:

determining using a second bit value of the first bit vector, that the first processing node is currently tracking the first object; and changing, by the computer system, the first bit value from the second value to the first value; and transmitting, by the computer system, another command to the first processing node for deleting one or more events associated with the first object from the first spatial-region-representing relation operated upon by the first processing node.

19. The event processing system of claim 16, wherein the load balancer node and the plurality of processing nodes correspond to separate processors of a single computer system.

20. The event processing system of claim 16, wherein the load balancer node and the plurality of processing nodes correspond to separate computer systems.

* * * * *

UNITED STATES PATENT AND TRADEMARK OFFICE
CERTIFICATE OF CORRECTION

PATENT NO.       : 9,804,892 B2
APPLICATION NO.  : 15/360650
DATED            : October 31, 2017
INVENTOR(S)      : Park et al.

It is certified that error appears in the above-identified patent and that said Letters Patent is hereby corrected as shown below:

On page 6, Column 1, under Other Publications, Line 9, delete "lOg" and insert -- 10g --, therefor.

On page 10, Column 1, under Other Publications, Line 47, delete "SIGMOD-SIGACT-SIDART" and insert -- SIGMOD-SIGACT-SIGART --, therefor.

On page 12, Column 1, under Other Publications, Line 38, delete "PostgresSql," and insert -- PostgreSql, --, therefor.

On page 12, Column 1, under Other Publications, Line 56, delete "ITJungle.corn," and insert -- ITJungle.com, --, therefor.

On page 12, Column 2, under Other Publications, Line 3, delete "deve10perworks/" and insert -- developerworks/ --, therefor.

Signed and Sealed this
Nineteenth Day of June, 2018

Andrei Iancu
*Director of the United States Patent and Trademark Office*